(12) United States Patent
Xu et al.

(10) Patent No.: US 12,015,171 B2
(45) Date of Patent: Jun. 18, 2024

(54) BATTERY MODULE, BATTERY PACK, APPARATUS AND FAILURE TREATMENT METHOD

(71) Applicant: CONTEMPORARY AMPEREX TECHNOLOGY CO., LIMITED, Ningde (CN)

(72) Inventors: Ye Xu, Ningde (CN); Xuan Chen, Ningde (CN); Di Zhou, Ningde (CN); Zengzhong Wang, Ningde (CN); Jianxian Lv, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 763 days.

(21) Appl. No.: 17/134,005

(22) Filed: Dec. 24, 2020

(65) Prior Publication Data
US 2021/0313654 A1    Oct. 7, 2021

Related U.S. Application Data

(63) Continuation of application No. PCT/CN2020/083334, filed on Apr. 3, 2020.

(51) Int. Cl.
*H01M 50/503* (2021.01)
*H01M 50/204* (2021.01)
(Continued)

(52) U.S. Cl.
CPC ....... *H01M 50/503* (2021.01); *H01M 50/204* (2021.01); *H01M 50/249* (2021.01);
(Continued)

(58) Field of Classification Search
CPC ............. H01M 50/503; H01M 50/204; H01M 50/249; H01M 50/51; H01M 50/529; H01M 2220/20
See application file for complete search history.

(56) References Cited

U.S. PATENT DOCUMENTS

| | | |
|---|---|---|
| 2013/0252052 A1 | 9/2013 | Dawley |
| 2016/0260959 A1 | 9/2016 | Guen |
| | (Continued) | |

FOREIGN PATENT DOCUMENTS

| | | |
|---|---|---|
| CN | 101826611 A | 9/2010 |
| CN | 103872710 A | 6/2014 |
| | (Continued) | |

OTHER PUBLICATIONS

International Search Report and Written Opinion, PCT/CN2020/083334, Jan. 7, 2021, 8 pgs.
(Continued)

*Primary Examiner* — Adam A Arciero
(74) *Attorney, Agent, or Firm* — Kilpatrick Townsend & Stockton LLP

(57) ABSTRACT

This application relates to a battery module and a battery pack. The battery module includes: a plurality of battery cells, configured to be connected in series, where after the battery module fails, the plurality of battery cells include a failed battery cell and at least one non-failed battery cell adjacent to the failed battery cell; and a first connecting piece, configured to connect the failed battery cell to the at least one non-failed battery cell, where the first connecting piece includes a first connecting portion and a conductive portion connected to the first connecting portion, the first connecting portion is configured to be electrically connected to an enclosure of the failed battery cell, and the conductive portion is configured to be electrically connected to the at least one non-failed battery cell, so as to restore the battery module to work.

15 Claims, 17 Drawing Sheets

(51) Int. Cl.
*H01M 50/249* (2021.01)
*H01M 50/51* (2021.01)
*H01M 50/529* (2021.01)

(52) U.S. Cl.
CPC ......... *H01M 50/51* (2021.01); *H01M 50/529* (2021.01); *H01M 2220/20* (2013.01)

(56) References Cited

U.S. PATENT DOCUMENTS

| | | | |
|---|---|---|---|
| 2017/0263915 A1* | 9/2017 | Umeyama | H01M 50/574 |
| 2019/0288345 A1 | 9/2019 | Hinterberger et al. | |
| 2020/0083512 A1* | 3/2020 | Son | H01M 50/503 |
| 2021/0167468 A1* | 6/2021 | Matsumura | H01M 50/516 |

FOREIGN PATENT DOCUMENTS

| | | |
|---|---|---|
| CN | 209496940 U | 10/2019 |
| EP | 2226868 A1 | 9/2010 |
| EP | 2768069 A1 | 8/2014 |
| JP | 2003132873 A | 5/2003 |
| JP | 2004319463 A | 11/2004 |
| JP | 2010192419 A | 9/2010 |
| JP | 2010205728 A | 9/2010 |
| JP | 2012069406 A | 4/2012 |
| JP | 2014032949 A | 2/2014 |
| JP | 2014157813 A | 8/2014 |
| JP | 2017139159 A | 8/2017 |
| JP | 2022549026 A | 11/2022 |
| KR | 1020120056812 A | 6/2012 |
| WO | 2013015524 A1 | 1/2013 |
| WO | 2018157651 A1 | 9/2018 |
| WO | 2019153459 A1 | 8/2019 |
| WO | WO-2019239919 A1 * | 12/2019 ......... H01M 50/204 |

OTHER PUBLICATIONS

Contemporary Amperex Technology Co. Ltd., Supplementary European Search Report, EP 20824421.0, Nov. 12, 2021, 9 pgs.

* cited by examiner

BATTERY MODULE, BATTERY PACK, APPARATUS AND FAILURE TREATMENT METHOD

CROSS REFERENCE TO RELATED APPLICATION

The present application is a continuation application of PCT Patent Application No. PCT/CN2020/083334, entitled "BATTERY MODULE, BATTERY PACK, APPARATUS AND FAILURE TREATMENT METHOD" filed on Apr. 3, 2020, the content of which is hereby incorporated by reference in its entirety.

TECHNICAL FIELD

This application relates to the technical field of energy storage components, and in particular, to a battery module, a battery pack, an apparatus, and a failure treatment method.

BACKGROUND

A battery module includes a plurality of stacked battery cells, and the plurality of battery cells are electrically connected, so as to implement output of electric energy of the battery module and supply power to an electric device. When a battery cell is faulty, the whole circuit of the battery module fails, and thus the battery module cannot work normally.

SUMMARY

This application provides a battery module, a battery pack, an apparatus and a failure treatment method. The battery module has a relatively small quantity of components, a relatively simple structure, and a relatively high energy density.

A first aspect of the embodiments of this application provides a battery module, where the battery module includes:
  a plurality of battery cells, configured to be connected in series, where after the battery module fails, the plurality of battery cells include a failed battery cell and at least one non-failed battery cell adjacent to the failed battery cell; and
  a first connecting piece, configured to connect the failed battery cell to the at least one non-failed battery cell, where the first connecting piece includes a first connecting portion and a conductive portion connected to the first connecting portion, the first connecting portion is configured to be electrically connected to an enclosure of the failed battery cell, and the conductive portion is configured to be electrically connected to the at least one non-failed battery cell, so as to restore the battery module to work.

In a possible design, the enclosure includes a housing and a top cover connected to the housing.

The first connecting portion is configured to be connected to the housing or the top cover of the failed battery cell.

In a possible design, the first connecting portion is bent, relative to the conductive portion, toward the enclosure of the failed battery cell, so that the first connecting portion is connected to the enclosure of the failed battery cell.

In a possible design, one of the first connecting portion and the enclosure of the failed battery cell is provided with a raised portion and the other is provided with a recessed portion.

The raised portion is configured to be connected to the recessed portion.

In a possible design, the raised portion is disposed in the enclosure, and the raised portion protrudes in a direction away from the enclosure.

The recessed portion is a through hole disposed in the first connecting portion.

The raised portion is configured to plug into the through hole.

In a possible design, the first connecting portion is riveted or welded to the enclosure of the failed battery cell.

In a possible design, the first connecting portion is connected to the conductive portion by using a second connecting portion.

In a possible design, the battery module further includes a second connecting piece configured to connect at least two of the non-failed battery cells.

The second connecting piece is provided with a bending guide portion for guiding the second connecting piece to bend and form the first connecting portion and the conductive portion that are bent relative to each other.

A second aspect of an embodiment of this application provides a battery pack, where the battery pack includes: the battery module described above; and a case, configured to accommodate the battery module.

A third aspect of an embodiment of this application provides an apparatus, where the apparatus includes the battery pack described above, and the battery pack is configured to provide electric energy.

A fourth aspect of an embodiment of this application provides a failure treatment method for processing a failed battery cell, where the failure treatment method includes:
  electrically connecting a connecting piece connected to the failed battery cell to an enclosure of the failed battery cell.

In a possible design, the enclosure includes a housing and a top cover connected to the housing.

When a connecting piece connected to the failed battery cell is electrically connected to the enclosure of the failed battery cell, the failure treatment method includes:
  connecting the connecting piece connected to the failed battery cell to the enclosure and the top cover of the failed battery cell.

In a possible design, before the connecting piece connected to the failed battery cell is electrically connected to the enclosure of the failed battery cell, the failure treatment method further includes:
  bending the connecting piece connected to the failed battery cell, and forming a first connecting portion after bending, where the first connecting portion is configured to be connected to the enclosure of the failed battery cell.

In a possible design, the connecting piece includes a bending guide portion.

Before a connecting piece connected to the failed battery cell is connected to the enclosure of the failed battery cell, the failure treatment method further includes:
  bending the connecting piece along the bending guide portion to form the first connecting portion and the conductive portion.

In a possible design, the connecting piece further includes a fracture guide portion and a connecting portion.

Before the bending the connecting piece along the bending guide portion, the failure treatment method further includes:
  disconnecting the fracture guide portion.

In a possible design, one of the first connecting portion and the enclosure of the failed battery cell is provided with a raised portion and the other is provided with a recessed portion.

When the connecting piece connected to the failed battery cell is electrically connected to the enclosure of the failed battery cell, the failure treatment method includes:

connecting the raised portion to the recessed portion.

In a possible design, the raised portion is disposed in the enclosure, and the recessed portion is a through hole disposed in the first connecting portion.

When the raised portion is connected to the recessed portion, the failure treatment method includes:

passing the raised portion through the through hole, and connecting the raised portion and the through hole by using a conductive material.

In a possible design, before bending the connecting piece connected to the failed battery cell, the failure treatment method further includes:

disconnecting an electrode terminal of the failed battery cell from at least one of the second connecting pieces connected to the electrode terminal.

In a possible design, before the disconnecting an electrode terminal of the failed battery cell from at least one of the connecting pieces connected to the electrode terminal, the failure treatment method further includes:

placing a pad between the connecting piece and the enclosure of the non-failed battery cell connected to the connecting piece.

In the battery module, there is no need to add another component to connect the electrode terminal of the failed battery cell, and only a corresponding operation is performed on an original connecting piece of the battery module. In this way, a quantity of components of the battery module can be reduced, complexity of a structure of the battery module can be reduced, and normal use of the battery module can be ensured.

It should be understood that the foregoing general descriptions and the following detailed descriptions are merely examples, and do not constitute any limitation on this application.

Figure 1:
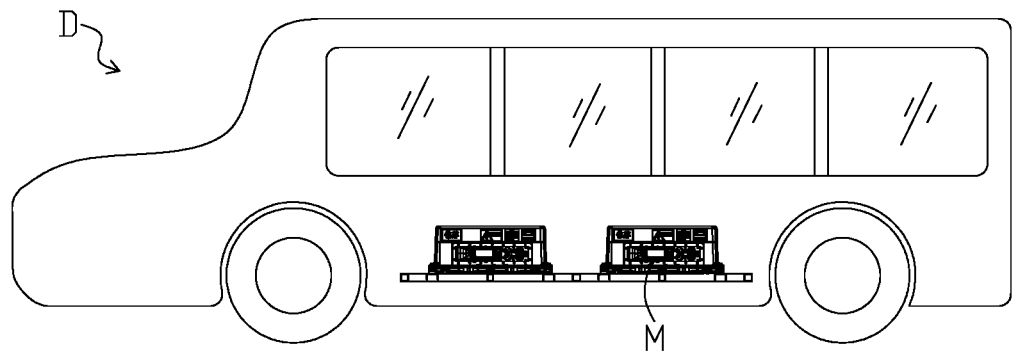
FIG. 1 is a schematic structural diagram of the apparatus according to this application in a specific embodiment.

Reference numerals in the drawings are as follows:
D—apparatus;
M—battery pack;
M1—case;
  M11—upper case;
  M12—lower case;
  M13—cavity;
M2—battery module;
1—battery cell;
  11—electrode terminal;
    111—positive terminal;
    112—negative terminal;
  12—enclosure;
    121—top cover;
      121a—raised portion;
    122—housing;
  13—failed battery cell;
  14—non-failed battery cell;
  15—electrode assembly;
2—connecting piece;
  2A—first connecting piece;
    21A—first portion;
    22A—second portion;
  2B—second connecting piece;
    21B—third portion;
    22B—fourth portion;
  23—first connecting portion;
    231—recessed portion;
      231a—through hole;
    232—first preset space;
  24—second connecting portion;
    241—via;
  25—intermediate component;
    251—connecting portion;
    252—fracture guide portion;
      252a—bending structure;
      252b—second preset space;
  26—conductive portion;
  27—connecting piece;
3—pad;
4—wide chisel; and
5—narrow chisel.

The accompanying drawings herein, which are incorporated in and constitute a part of the specification, illustrate embodiments that conform to this application, and serve to explain the principles of this application in combination with the specification.

DESCRIPTION OF EMBODIMENTS

To better understand the technical solutions in this application, the following describes embodiments of this application with reference to the accompanying drawings.

It should be understood that the described embodiments are merely some but not all of the embodiments of this application. All other embodiments obtained by a person of ordinary skill in the art based on the embodiments in this application without creative efforts shall fall within the protection scope of this application.

The terms used in the embodiments of this application is for the purpose of describing specific embodiments and is not intended to limit this application. The singular forms "one", "said" and "the" used in the embodiments of this application and the appended claims are also intended to include plural forms unless the context clearly indicates other meanings.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that the directional terms such as "up", "down", "left", and "right" described in the embodiments of this application are described as seen from the angles shown in the accompanying drawings, and should not be understood as a limitation to the embodiments of this application. In addition, in the context, it should be further understood that when an element is referred to as being "above" or "under" another element, the element can not only be directly connected "above" or "under" the another element, but also be indirectly connected "above" or "under" the another element through an intermediate element.

The embodiments of this application provide an apparatus, a battery pack and a battery module that use battery cells as a power source. The apparatus may be a mobile device such as a vehicle, a ship, or a small aircraft, and includes a power source. The power source is configured to provide a driving force for the apparatus, and the power source may be configured as a battery module that provides electric energy to the apparatus. The driving force of the apparatus may be all electric energy, or may include electric energy and another energy source (for example, mechanical energy), and the power source may be a battery module (or a battery pack). In addition, the apparatus may alternatively be an energy storage device such as a battery cabinet, and the battery cabinet may include a plurality of battery modules (or battery packs), so that the battery cabinet can output electric energy. Therefore, any apparatus capable of using battery cells as a power source is within the protection scope of this application.

As shown in FIG. 1, a vehicle is used as an example. In an embodiment of this application, an apparatus D may be a new energy vehicle, and the new energy vehicle may be a battery electric vehicle, or may be a hybrid electric vehicle or an extended-range electric vehicle. The vehicle may include a battery pack M and a vehicle body. The battery pack M is disposed in the vehicle body. The vehicle body is further provided with a drive motor, and the drive motor is electrically connected to the battery pack M. The battery pack M provides electric energy, and the drive motor is connected to a wheel on the vehicle body by using a drive mechanism, so as to drive the vehicle. Specifically, the battery pack M may be horizontally arranged at the bottom of the vehicle body.

Figure 2:
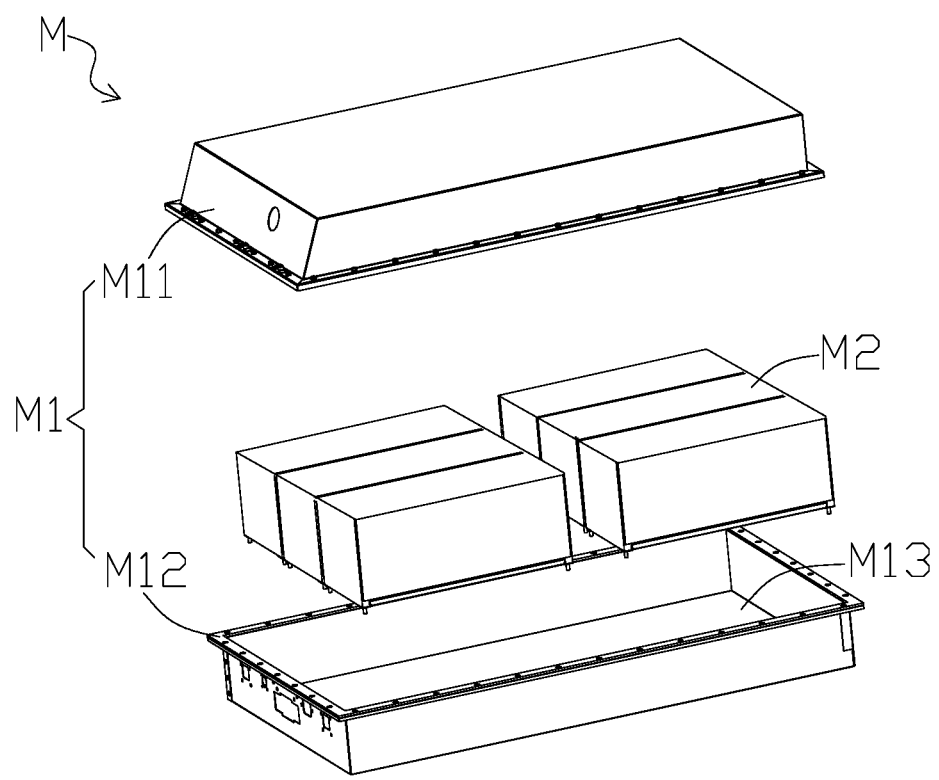
FIG. 2 is a schematic structural diagram of the battery pack of FIG. 1 in a specific embodiment.

As shown in FIG. 2, a battery pack M includes a case M1 and a battery module M2 of this application, where the case M1 has a cavity M13, and the battery module M2 is accommodated in the cavity M13. There may be one or more battery modules M2, and the plurality of battery modules M2 are arranged in the cavity M13. The case M1 is not limited in types, may be a frame case, a disk-shaped case, a box-shaped case, or the like. Specifically, as shown in FIG. 2, the case M1 may include a lower case M12 accommodating the battery module M2 and an upper case M11 covered with the lower case M12.

It should be noted that the thickness direction X, the length direction Y and the height direction Z mentioned in this specification are defined based on battery cells. The thickness direction X is the thickness direction of the battery cells, the height direction Z is the extension direction of electrode terminals in the battery cells, and the length direction Y is the direction perpendicular to the foregoing thickness direction X and the height direction Z (the three directions are approximately perpendicular), that is, the length direction Y is perpendicular to the plane formed by the thickness direction X and the height direction Z.

The battery module includes a plurality of battery cells and a frame structure for fixing the battery cells, and the plurality of battery cells may be stacked with each other along the thickness direction X. The frame structure may include an end plate located at both ends of the battery cells in the thickness direction X, and is configured to restrict movement of the battery cells in the thickness direction X. In addition, in a specific embodiment, the frame structure may further include a side plate located on both sides of battery cells along the length direction Y, and the side plate is connected to the end plate to form the frame structure. In another embodiment, the frame structure may not be provided with a side plate. Battery cells are stacked and connected by using a first cable tie or by using a first cable tie and a second cable tie, and the end plate and the cable tie form the foregoing frame structure. In addition, in a specific embodiment, a battery pack may include a case and a plurality of battery cells, where the case has a cavity, and the plurality of battery cells are located in the cavity and may be connected to the case. Specifically, the battery cells may be bonded to an inner wall of the case by using an adhesive.

Electrode terminals include a first electrode terminal and a second electrode terminal with opposite polarities. In a battery module or battery pack, a plurality of battery cells are electrically connected to form a circuit of the battery module or battery pack. The battery cells may be specifically connected in series, and the battery cells may be connected by using a connecting piece. For example, when the battery cells are connected in series, a first electrode terminal of one battery cell and a second electrode terminal of another battery cell are connected by using a connecting piece.

In a working process of the battery module, each battery cell is constantly charged and discharged. When a battery cell is faulty (such as abnormal attenuation of capacity), the battery cell will fail to work normally. Therefore, in this specification, a battery cell that fails to work normally is defined as a failed battery cell, and a battery cell that can work normally without failure is defined as a non-failed battery cell. In this case, due to existence of one or more failed battery cells in the battery module or battery pack, the circuit of the battery module or battery pack fails and power cannot be normally supplied, that is, the battery module or battery pack fails. To solve the technical problem, according to this application, the failed battery cell is removed from the circuit of the battery module, and a new circuit is formed.

It should be noted that the battery cell mentioned in this embodiment of this application may include the following two cases: Case 1: When the battery module includes a plurality of single battery cells connected in series, the battery cell in this embodiment of this application may be a single battery cell. Accordingly, a failed battery cell may be one of the failed single battery cells. Case 2: When the battery module includes at least one parallel group formed by two or more single battery cells in parallel, the battery cell in this embodiment of this application may be one parallel group. Accordingly, a failed battery cell is one of the parallel groups, and the parallel group includes at least one failed single battery cell.

In addition, the battery cell in this embodiment of this application may be a soft-pack battery, a square battery, a cylindrical battery, or the like.

Figure 3:
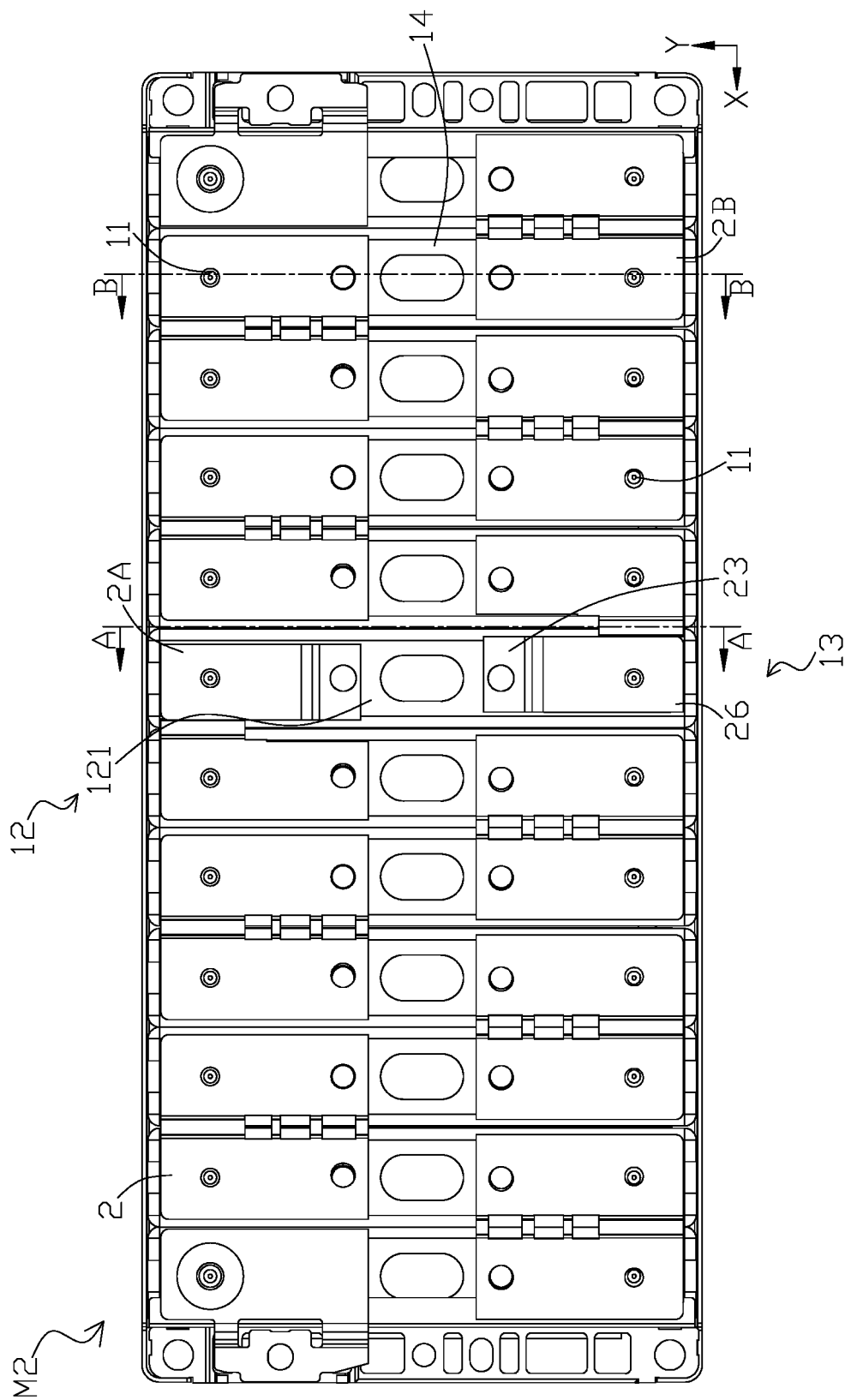
FIG. 3 is a top view of the battery module of FIG. 2 in a specific embodiment.

To solve the foregoing technical problem, as shown in FIG. 3, a battery module M2 includes a first connecting piece 2A, and the first connecting piece 2A includes a first connecting portion 23 and a conductive portion 26 that are connected to each other. The first connecting portion 23 may be directly connected to the conductive portion 26, or may be indirectly connected by using another component, provided that connection between the first connecting portion 23 and the conductive portion 26 can be implemented.

In this embodiment, after the battery module M2 fails, a plurality of battery cells 1 connected in series may include a failed battery cell 13 and at least one non-failed battery cell 14 adjacent to the failed battery cell 13. The term "adjacent" includes that the non-failed battery cell 14 is physically adjacent to the failed battery cell 13, that is, there is no other battery cell therebetween (there may be a structure such as a heat insulation pad, and a cushion pad therebetween); and the non-failed battery cell 14 is electrically adjacent to the failed battery cell 13, where the term "electrically adjacent" means battery cells connected with a same connecting piece are electrically adjacent to each other along a direction of current flow, and when the battery cells are electrically adjacent, there may be another battery cell between the two battery cells connected with a same connecting piece, that is, the connecting piece crosses at least one battery cell. In this case, the two battery cells electrically adjacent to each other are not physically adjacent.

The first connecting portion 23 of the first connecting piece 2A is configured to be electrically connected to an enclosure 12 of the failed battery cell 13, and the conductive portion 26 is configured to be electrically connected to at least one non-failed battery cell 14 (the non-failed battery cell 14 is adjacent to the failed battery cell 13). When the first connecting piece 2A is electrically connected to the enclosure 12 of the failed battery cell 13, the failed battery cell 13 can be short-circuited by using the first connecting piece 2A, so that the battery module M2 is restored to work.

In the existing design, when a battery cell in a battery pack fails, one can imagine replacing the failed battery cell or replacing and repairing an entire battery module to accelerate maintenance efficiency. Therefore, in a maintenance process, the failed battery pack (the battery pack including the failed battery cell) needs to be returned to the factory to match a corresponding battery cell or battery module, or a corresponding battery cell model or battery module model needs to be sent to the manufacturer. This process takes a lot of time to wait, which is not conducive to resource optimization.

The foregoing treatment is consistent with treatment manners in most areas, that is, a failed component or structure is replaced to restore an overall structure. Therefore, at maintenance points in most areas, samples of components that are prone to failure will be prepared, and related simple testing equipment will be prepared. If a component that is not prone to failure or a component that is not easy to store and place fails, a maintenance point needs to transfer the component from the manufacturer to implement replacement and maintenance of the component. If a more complex maintenance manner occurs, technical support further needs to be requested from the manufacturer.

In the battery field, battery cells account for a large proportion of failed components of battery packs. However, there are many difficulties in preparing battery cells, and battery cells are not components that can be stored for a long time. Reasons are as follows: 1. Currently, many models of battery cells exist and vary in size, capacity, chemical system, structure, and the like. 2. A battery cell will self-discharge when placed for a long time. The longer the battery cell is placed, capacity balance between positive and negative terminals will be broken and deepened gradually. 3. When a battery cell is placed for a long time, a decomposition reaction of an electrolyte can also accumulate some irreversible capacity losses. In addition, the storage condition of a battery cell is also relatively high. If environmental factors are not ensured, self-discharge of the battery cell may be accelerated.

Even if there is no issue of model and all battery cells adopt a same structure, parameters such as capacity and self-discharge rate of the battery cells need to be re-measured if the battery cells are to be reused after long-term storage. However, there will not be such test conditions at a general maintenance point, and operators do not have professional analysis capabilities; and battery cells that have not been retested cannot guarantee normal operation of the battery pack after maintenance. In addition, coupled with the issue of battery model, each maintenance point not only needs to store battery cells of different models, but also needs to be equipped with related testing equipment and corresponding technical personnel. Therefore, it is difficult for maintenance points to implement the foregoing replacement of battery cells.

Therefore, in order to improve maintenance efficiency of a battery pack currently, operators will replace a failed battery module (the failed battery module means a battery module including a failed battery cell) in a battery pack. This manner can quickly implement maintenance. However, a battery module includes a plurality of battery cells. In rare cases, all battery cells in a battery module fail. Normally, failure of only a small quantity of battery cells in a battery module (for example, only one battery cell fails) will cause the battery module to fail to work normally. In this case, replacing the entire battery module will cause waste of resources.

Further, replacement of a new battery module also have a greater problem in battery balancing. During normal use, a capacity of a battery pack will be attenuated, and capacities of a newly replaced battery module and an old battery module will be different. According to the cask principle, a capacity of a battery pack depends on the battery module with the lowest capacity, and thus the newly replaced battery module cannot play a good role in a structure. Second, due to attenuation of the capacity, the old battery module is fully charged and discharged each time, which will accelerate the old battery module to reach the end of service life. In addition, internal resistance of the old battery module is larger than that of the newly replaced battery module, and when same current flows through the old battery module and the newly replaced battery module, there is more heat generated by the old battery module with large internal resistance. That is, temperature of battery cells in the old battery module is higher, and deterioration rate of the battery cells is accelerated, which causes further increase of the internal resistance of the old battery module. Therefore, the internal resistance and temperature increase of the battery cells form a pair of negative feedback, which accelerates deterioration of the battery cells with high internal resistance.

Besides, for a circuit of an electric device, both a short circuit and an open circuit are used to describe a circuit fault. Currently, the short circuit is mainly used to implement fuse fusing, or load of another test device, or the like. However, no one will add a conductive component to a corresponding structure to make a failed battery cell short-circuit. From simple recognition, it will be considered that there is a big problem and cannot achieve the objective. However, in an entire battery module, short circuit of one of battery cells will not cause a large change in capacity, thus ensuring normal use of a battery pack.

Figure 4:
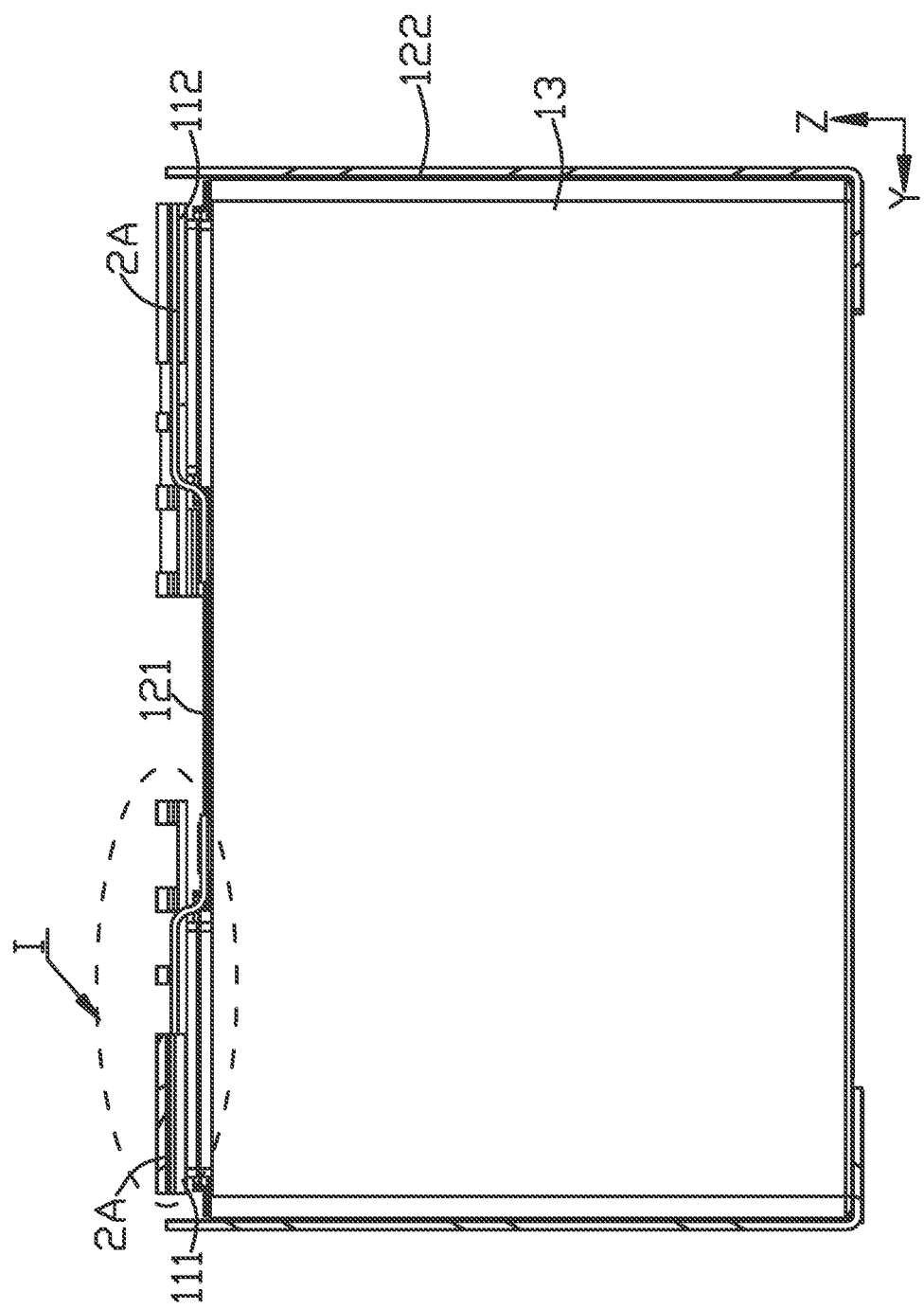
FIG. 4 is a section view along the line A-A of FIG. 3.

In this embodiment, as shown in FIG. 4, a positive terminal 111 and a negative terminal 112 of the failed battery cell 13 are connected to the enclosure by using the first connecting piece 2A, and thus the failed battery cell 13 is short-circuited and no longer participates in charging and discharging processes of a battery module, that is, the failed battery cell 13 does not affect a circuit of the battery module. Therefore, when one or more failed battery cells 13 exist in a working process of the battery module, only the first connecting piece 2A connected to each failed battery cell 13 needs to be connected to the enclosure of the failed battery cell 13 without replacing the entire battery module. When the battery module is applied to a vehicle, the vehicle can be directly repaired in a 4S store without the need to return the entire vehicle to the factory or replace a new battery pack, thereby improving maintenance efficiency of the battery module and simplifying a maintenance process and maintenance costs. In addition, after the foregoing processing, only a small quantity of single battery cells (single battery cells of the failed battery cell 13) in the battery module do not participate in formation of a circuit, which does not cause a large reduction in battery capacity of the battery module, so that the battery module and the battery pack can work normally.

In addition, for a structure in which battery cells are adhered to a cavity of a case by using a structural adhesive, when a battery cell fails, it is difficult to remove the failed battery cell from the cavity. Therefore, the processing manner in this embodiment has advantages of convenience and high efficiency.

In addition, in the battery module, there is no need to add another component for connection to implement short circuit of the failed battery cell 13, and only a corresponding operation is performed on the original connecting piece of the battery module. In this way, a quantity of components of the battery module can be reduced, complexity of a structure of the battery module can be reduced, and the battery module can have a higher energy density.

Specifically, as shown in FIG. 4, the enclosure 12 of the failed battery cell 13 includes a housing 122 and a top cover 121 connected to the housing 122. The top cover 121 is connected to an opening of the housing 122 to form an electrode assembly for accommodating battery cells and an inner cavity of an electrolyte. A first electrode terminal 111 and a second electrode terminal 112 are disposed on the top cover 121. Based on this, a first connecting portion of the first connecting piece 2A is configured to be electrically connected to the housing 122 or the top cover 121 of the failed battery cell 13, so that short circuit of the failed battery cell 13 can be implemented by using the first connecting piece 2A, and the battery module is restored to work.

In addition, when the first connecting piece 2A is provided with two or more first connecting portions 23, a part of the two or more first connecting portions 23 may be configured to be connected to the top cover 121 of the failed battery cell 13, and the other part may be configured to be connected to the housing 122 of the failed battery cell 13.

More specifically, when the housing of the failed battery cell is connected by using the first connecting portion, the first connecting portion of the first connecting piece may be bent, relative to the conductive portion, toward the housing or the top cover of the failed battery cell, thereby facilitating connection between the first connecting portion and the housing or the top cover of the failed battery cell.

In addition, when the first connecting piece is provided with two or more first connecting portions, one part of the two or more first connecting portions is bent toward the top cover of the failed battery cell, and the other part may be bent toward the housing of the failed battery cell.

Figure 5:
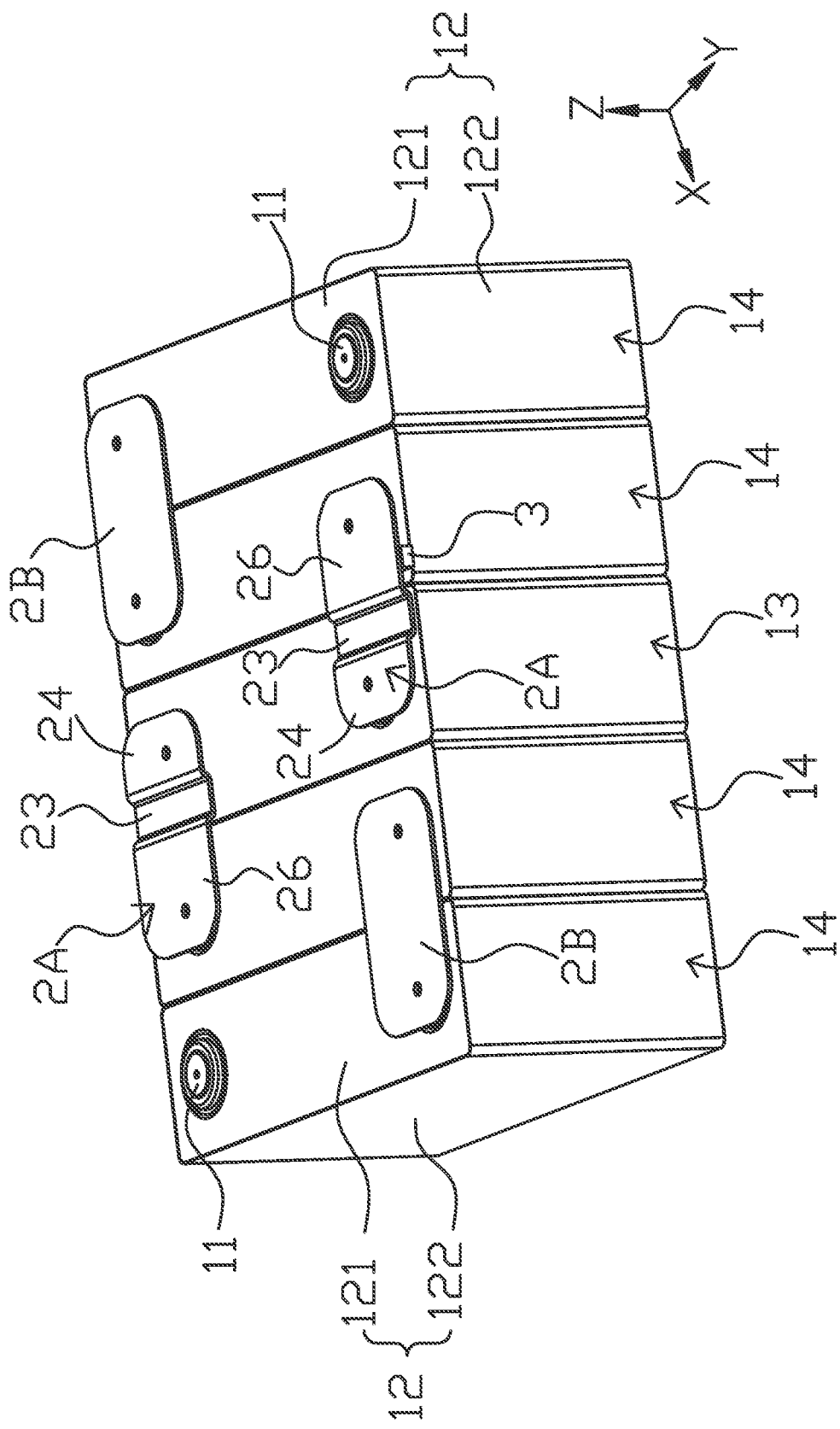
FIG. 5 is a locally enlarged view of part I in FIG. 4.

Specifically, in an embodiment shown in FIG. 5, a first connecting portion 23 of the first connecting piece 2A is bent, relative to the conductive portion 26, toward the top cover 121 of the failed battery cell 13, so that the first connecting portion 23 is configured to be electrically connected to the top cover 121 of the failed battery cell 13. In addition, the conductive portion 26 of the first connecting piece 2A may be configured to be electrically connected to an electrode terminal 11 of a non-failed battery cell 14 adjacent to the failed battery cell 13. Therefore, after the first connecting portion 23 of the first connecting piece 2A is electrically connected to the top cover 121 of the failed battery cell 13, current of one non-failed battery cell 14 flows to the top cover 121 of the failed battery cell 13 through the conductive portion 26 and the first connecting portion 23, and then flows to another non-failed battery cell 14 through a first connecting portion 23 and a conductive portion 26 of another first connecting piece 2A, thereby restoring function of a battery module.

In this embodiment, the first connecting portion 23 of the first connecting piece 2A is bent toward a direction of the top cover 121 of the failed battery cell 13, so that connection between the first connecting piece 2A and the top cover 121 can be easily implemented, and connection reliability therebetween can be improved, thereby improving operation reliability of the battery module.

Figure 6:
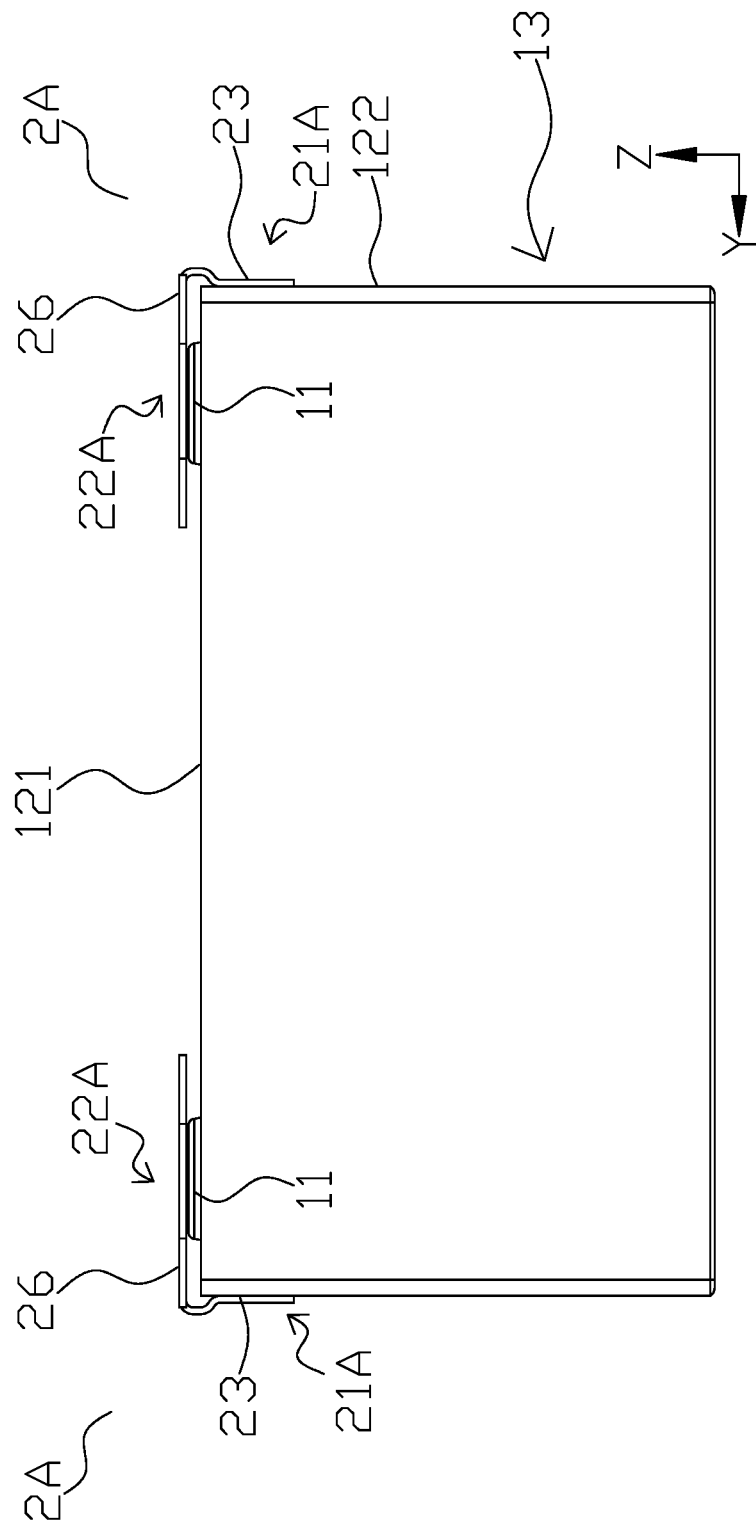
FIG. 6 is a schematic diagram of a local structure of the battery module of FIG. 2 in a first specific embodiment.

In an embodiment shown in FIG. 6, a first connecting portion 23 may further be connected to a housing 122 of a failed battery cell 13 to implement connection of the first connecting portion 23 to the enclosure. Specifically, as shown in FIG. 6, along a length direction Y of battery cells 1, the first connecting portion 23 is located at an end of the failed battery cell 13, and the first connecting portion 23 is bent toward the housing 122 of the failed battery cell 13, so that the first connecting portion 23 is electrically connected to the housing 122 of the failed battery cell 13.

In this embodiment, as shown in FIG. 6, the first connecting piece 2A includes the first connecting portion 23 and a conductive portion 26. The first connecting portion 23 is bent, relative to the conductive portion 26, along a height direction Z of the battery cells. After bending, the first connecting portion 23 is located at the end of the housing 122 along the length direction Y of the battery cells, and is configured to be connected to the housing 122. In addition, the conductive portion 26 is connected to an electrode terminal of a non-failed battery cell 14. Therefore, after the first connecting portion 23 of the first connecting piece 2A is electrically connected to the housing 122 of the failed battery cell 13, current of one non-failed battery cell 14 flows to the housing 122 of the failed battery cell 13 through the conductive portion 26 and the first connecting portion 23, and then flows to another non-failed battery cell 14 through a first connecting portion 23 and a conductive portion 26 of another first connecting piece 2A, thereby restoring function of a battery module.

In a specific embodiment, one of a first connecting portion of the first connecting piece and an enclosure of a failed battery cell are provided with a raised portion, and the other is provided with a recessed portion. The raised portion is connected to the recessed portion, so that connection between the first connecting portion and the enclosure of the failed battery cell is implemented. Moreover, one of the raised portion and the recessed portion may be disposed in the housing or the top cover of the failed battery cell.

Figure 7:
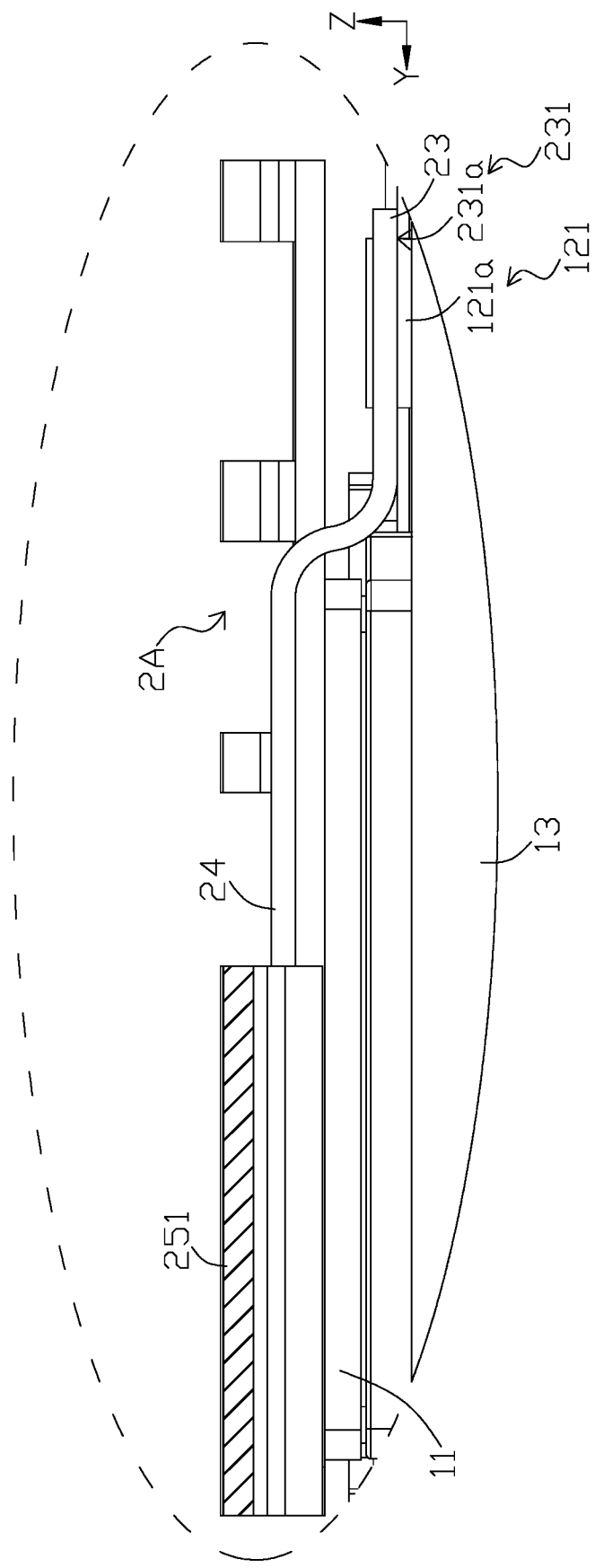
FIG. 7 is a schematic diagram of a local structure of the battery module of FIG. 2 in a second specific embodiment.

In an embodiment shown in FIG. 7, the top cover 121 of the failed battery cell 13 is provided with the raised portion 121a, and a first connecting portion 23 of the first connecting piece 2A is provided with the recessed portion 231. When the battery cell fails, the recessed portion 231 can matched with the raised portion 121a, thereby implementing connection between the first connecting piece 2A and the top cover 121.

In this embodiment, there is a certain height difference between a connecting piece 2 connected to the electrode terminal 11 of the failed battery cell 13 and the top cover 121. In this embodiment, the connection between the first connecting piece 2A and the top cover 121 can be easily implemented by setting the raised portion 121a, so as to ensure strength of connection between the first connecting piece 2A and the top cover 121, and the first connecting piece 2A and the top cover 121 can be accurately connected.

In addition, as shown in FIG. 7, along the height direction Z of the battery cells, the first connecting portion 23 of the first connecting piece 2A is bent, relative to the conductive portion 26, in a direction toward the top cover 121, that is, along the height direction Z of the battery cells. Compared with the conductive portion 26, a distance between the first connecting portion 23 and the top cover 121 is smaller. Because there is a certain height difference between the conductive portion 26 of the first connecting piece 2A and the top cover 121, when the first connecting portion 23 is bent in the direction of the top cover 121, the height difference between the first connecting portion 23 and the top cover 121 can be reduced, thereby facilitating connection between the first connecting portion 23 and the top cover 121.

Specifically, in order to facilitate relative bending between the first connecting portion 23 and the conductive portion 26, a bending guide portion (for example, a crease) may be provided therebetween. When failure treatment is performed, the first connecting portion 23 and the conductive portion 26 can be formed only by bending along the bending guide portion, which helps to implement relative bending between the first connecting portion 23 and the conductive portion 26, thereby facilitating accurate connection between the first connecting portion 23 and the top cover 121.

It should be noted that when the first connecting portion of the first connecting piece is connected to the housing of the failed battery cell, one of the first connecting portion and the housing may be provided with the raised portion, and the other may be provided with the recessed portion.

In a specific embodiment, as shown in FIG. 7, the raised portion 121a is disposed on the top cover 121 of the failed battery cell 13. Along the height direction Z of the battery cells 1, the raised portion 121a is raised in a direction away from the top cover 121, that is, the raised portion 121a is raised upward and close to the first connecting piece 2A.

Accordingly, the first connecting portion 23 of the first connecting piece 2A is provided with a through hole 231a, and the through hole 231a is the recessed portion 231. In this case, at least a part of the raised portion 121a is located in the corresponding through hole 231a and is matched with the through hole 231a, thereby implementing the connection between the top cover 121 and the first connecting piece 2A. In addition, in a process of connecting the top cover 121 and the first connecting piece 2A, the through hole 231a can also play a role of pre-positioning the top cover 121 and the first connecting piece 2A, so that fast installation of the top cover 121 and the first connecting piece 2A can be implemented.

Of course, the recessed portion 231 is not necessarily a hole-like structure (in the height direction Z, the recessed portion 231 penetrates the first connecting portion 23). The recessed portion 231 may be a groove structure, that is, in the height direction Z, the recessed portion 231 may not penetrate the first connecting portion 23. In addition, the raised portion 121a may have a cylindrical structure, or a structure of another shape such as a cuboid or a cone, provided that the raised portion 121a can be matched with the through hole 231a.

As shown in FIG. 7, a matching manner of the raised portion 121a and the through hole 231a may be specifically as follows: The raised portion 121a and the sidewall of the through hole 231a are interference fit, so as to implement connection therebetween. Alternatively, the raised portion 121a may be provided with a chuck groove. When the raised portion 121a passes through the through hole 231a, a part of the first connecting portion 23 is located in the chuck groove, so that the side wall of the chuck groove restricts a relative movement of the raised portion 121a and the first connecting portion 23 along a height direction Z of the battery cells, thereby implementing connection between the raised portion 121a and the through hole 231a. Alternatively, after the raised portion 121a passes through the through hole 231a, the raised portion 121a is deformed by pressing a portion of the raised portion 121a protruding from the first connecting portion 23, and abuts against an upper end face of the first connecting portion 23, thereby implementing connection between the raised portion 121a and the through hole 231a.

In this embodiment, after the through hole 231a is matched with the raised portion 121a, the first connecting portion 23 is in direct contact with the top cover 121 (through direct contact with the raised portion 121a).

In another specific embodiment, along the radial direction of the through hole 231a, there is a preset gap between the raised portion 121a and the corresponding through hole 231a, and the raised portion 121a is connected to the sidewall of the through hole 231a by using a conductive material. For example, the raised portions 121a may be welded to the sidewall of the through hole 231a, or may be connected by using a conductive adhesive, or may be connected by pouring molten tin, aluminum, or other metals. When the raised portion 121a and the through hole 231a are welded, a solder is located in a preset gap between the raised portion 121a and the through hole 231a, so that the raised portion 121a and the through hole 231a are connected, and can be electrically conductive. When the raised portion 121a and the through hole 231a are connected by using the conductive adhesive, the conductive adhesive is located in a preset gap between the raised portion 121a and the through hole 231a, so that the raised portion 121a and the through hole 231a are connected, and can be electrically conductive. When the raised portion 121a and the through hole 231a are connected by using a molten metal, the molten metal is cooled to be located in a preset gap between the raised portion 121a and the through hole 231a, so that the raised portion 121a and the through hole 231a are connected, and can be electrically conductive.

In addition, in the foregoing embodiments, when the top cover 121 and the first connecting piece 2A are connected by using the raised portion 121a and the through hole 241a, a bottom surface of the first connecting portion 23 and a top surface of the top cover 121 may be contacted or not along the height direction Z of the battery cells. When the two surfaces are contacted, the first connecting portion 23 and the top cover 121 may be connected by using a conductive material such as a conductive adhesive, so that a connection area between the first connecting piece 2A and the top cover 112 can be increased, thereby improving connection strength and an overcurrent area.

In addition to the foregoing connection manners, the first connecting portion 23 and the enclosure 12 of the failed battery cell 13 may be connected in the following manners.

Figure 8:
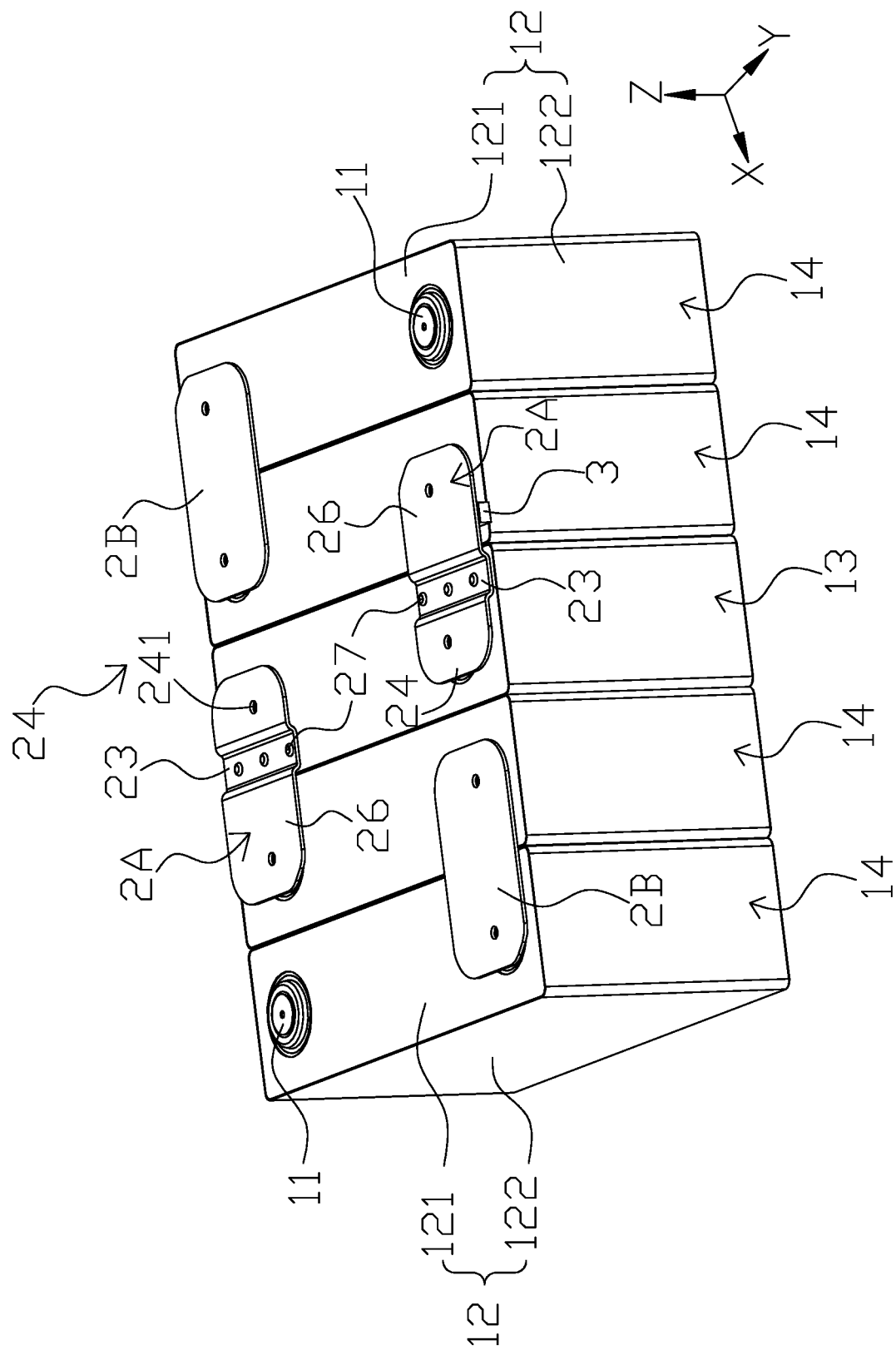
FIG. 8 is a schematic diagram of a local structure of the battery module of FIG. 2 in a third specific embodiment.

In a specific embodiment, as shown in FIG. 8, the first connecting portion 23 of the first connecting piece 2A is riveted to the enclosure 12 of the failed battery cell 13. Specifically, the first connecting portion 23 is riveted to the top cover 121 of the failed battery cell 13.

As shown in FIG. 8, the first connecting piece 2A includes a conductive portion 26 and a first connecting portion 23, and the first connecting portion 23 may have a structure formed by bending the first connecting piece 2A. The first connecting portion 23 is configured to be electrically connected to an enclosure 12 (for example, a top cover 121 or a housing 122) of a failed battery cell 13. The conductive portion 26 is electrically connected to a non-failed battery cell 14 adjacent to the failed battery cell 13 (the conductive portion 26 may be specifically electrically connected to an electrode terminal 11 of the non-failed battery cell 14). In this embodiment, the first connecting portion 23 and the enclosure 12 of the failed battery cell 13 may also be riveted by using a connecting piece 27, thereby improving connection reliability between the first connecting portion 23 and the enclosure 12, and improving working stability of a battery module.

Specifically, the connecting piece 27 may be specifically a rivet, and the first connecting portion 23 may be connected to the enclosure 12 of the failed battery cell 13 by using a plurality of rivets.

In this embodiment, when the first connecting portion 23 is riveted to the enclosure 12, a heat source does not need to be increased during connection, thereby reducing a risk of excessive temperature damage to battery cells when the heat source is introduced. In addition, the manner of riveting has advantages of simple operation, low maintenance costs and relatively low requirement for maintenance personnel.

Figure 9:
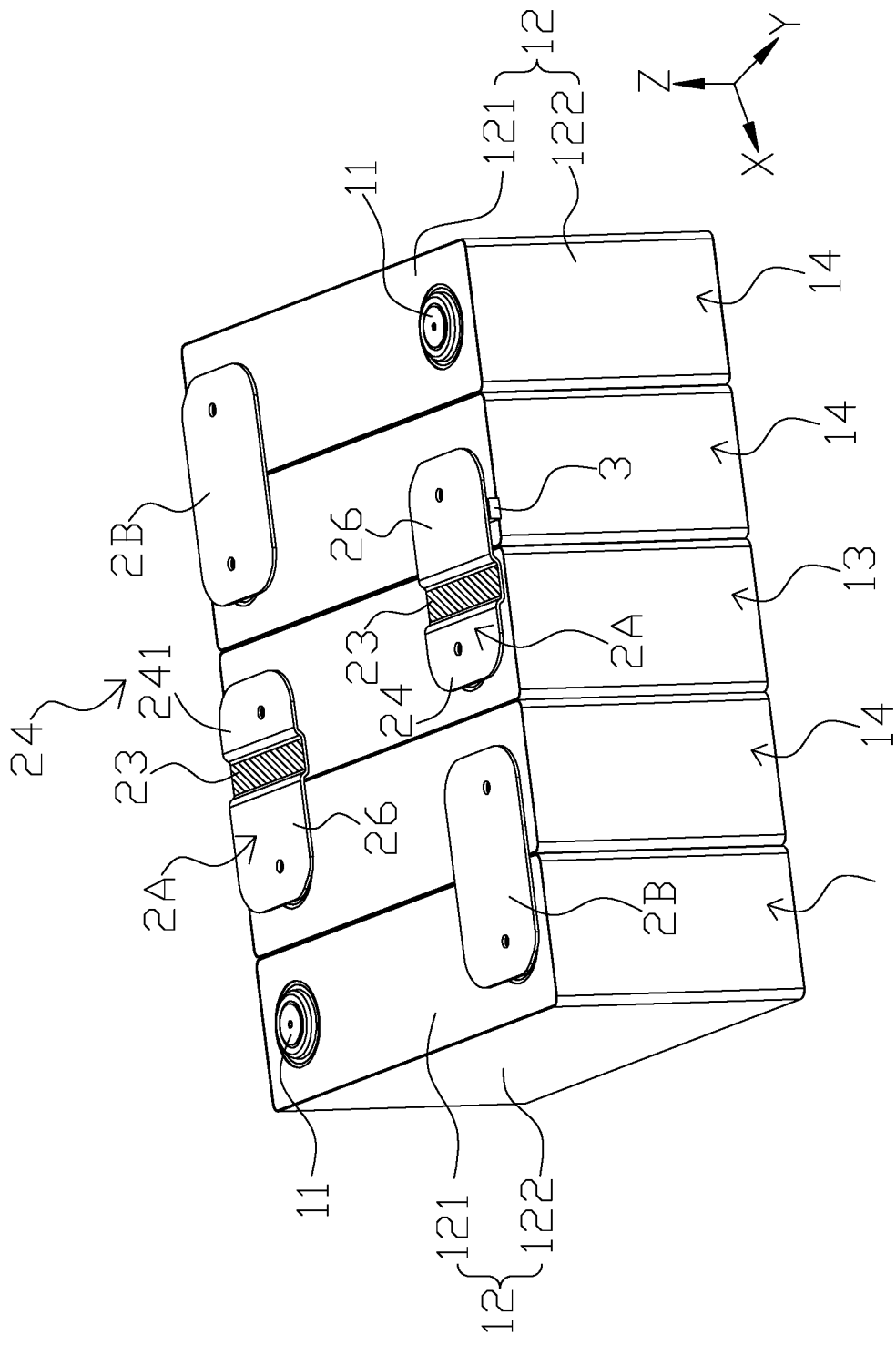
FIG. 9 is a schematic diagram of a local structure of the battery module of FIG. 2 in a fourth specific embodiment.

In another specific embodiment, as shown in FIG. 9, the first connecting portion 23 of the first connecting piece 2A is welded to the enclosure 12 of the failed battery cell 13. Specifically, the first connecting portion 23 is welded to the top cover 121 of the failed battery cell 13.

As shown in FIG. 9, the first connecting piece 2A includes a conductive portion 26 and a first connecting portion 23, and the first connecting portion 23 may have a structure formed by bending the first connecting piece 2A. The first connecting portion 23 is configured to be electrically connected to an enclosure 12 (for example, a top cover 121 or a housing 122) of a failed battery cell 13. The conductive portion 26 is electrically connected to a non-failed battery cell 14 adjacent to the failed battery cell 13 (the conductive portion 26 may be specifically electrically connected to an electrode terminal 11 of the non-failed battery cell 14). In this embodiment, the first connecting portion 23 may be welded to the enclosure 12 of the failed battery cell 13. In some embodiments, the first connecting piece 2A may be pressure-welded to the enclosure 12 of the failed battery cell 13 by using a high-temperature welding joint.

In this embodiment, when the first connecting portion 23 is welded to the enclosure 12, reliability of mechanical connection and electrical connection therebetween are relatively high, thereby improving working reliability of a battery module. Besides, no metal shavings are generated during welding of the first connecting portion 23 and the enclosure 12, thereby avoiding a risk of short circuit caused by the metal shavings generated by maintenance entering the battery module. In addition, when the first connecting portion 23 is welded to the enclosure 12, openings on the first connecting portion 23 and the enclosure 12 can be avoided, thereby avoiding inactivation of the failed battery cell 13 or leakage of an electrolyte from the openings.

Alternatively, the first connecting portion 23 of the first connecting piece 2A and the enclosure 12 of the failed battery cell 13 may be connected in a manner of both riveting and welding, thereby further improving reliability of connection therebetween.

In the foregoing embodiments, as shown in FIG. 5 to FIG. 9, the first connecting piece 21A may further include a second connecting portion 24, where the second connecting portion 24 is configured to be electrically connected to an electrode terminal 11 of a failed battery cell 13. Specifically, the second connecting portion 24 is provided with a via 241, and the electrode terminal 11 can be connected to the connecting piece after passing through the via 241. The electrode terminal 11 may be specifically connected to the connecting piece by welding.

For a battery module that does not fail, in order to implement series connection of a plurality of battery cells, a connecting piece in the battery module needs to be electrically connected to an electrode terminal of a battery module to be connected in series. Therefore, when the battery module includes the failed battery cell 13, and maintenance processing needs to be performed, only the first connecting piece 2A connected to the failed battery cell 13 needs to be processed, so that the first connecting piece 2A is electrically connected to an enclosure 12 of the failed battery cell 13. After processing, the first connecting piece 2A may still be connected to the electrode terminal 11 of the failed battery cell 13, and connected to the electrode terminal 11 of the non-failed battery cell 14 adjacent to the failed battery cell 13, that is, the first connecting piece 2A further includes the second connecting portion 24 electrically connected to the electrode terminal 11 of the failed battery cell 13.

In this embodiment, the connecting piece of the battery module has a relatively high ductility, so that bending of the first connecting piece 2A can be implemented under the ductility of the connecting piece of the battery module, and thus connection between the first connecting piece 2A and the enclosure 12 of the failed battery cell 13 can be easily implemented. In addition, the smaller the thickness of the connecting piece, the greater the ductility of the connecting piece, thus facilitating bending of the first connecting piece 2A. However, when the thickness of the first connecting piece 2A is too small, strength and rigidity are lower, and there is a risk of fracture. Therefore, the thickness of the connecting piece can be selected in consideration of the foregoing two factors, to make it have higher structural strength and easy to bend. The connecting piece may specifically have a strip structure, or may have a structure of another shape.

In addition, in this embodiment, the connecting piece connected to the failed battery cell 13 is kept in a complete structure, and there is no need to cut or remove the connecting piece, so that metal particles can be prevented from being generated during cutting and removal, and thus the metal particles can be prevented from entering the battery module to cause short circuit.

Figure 10:
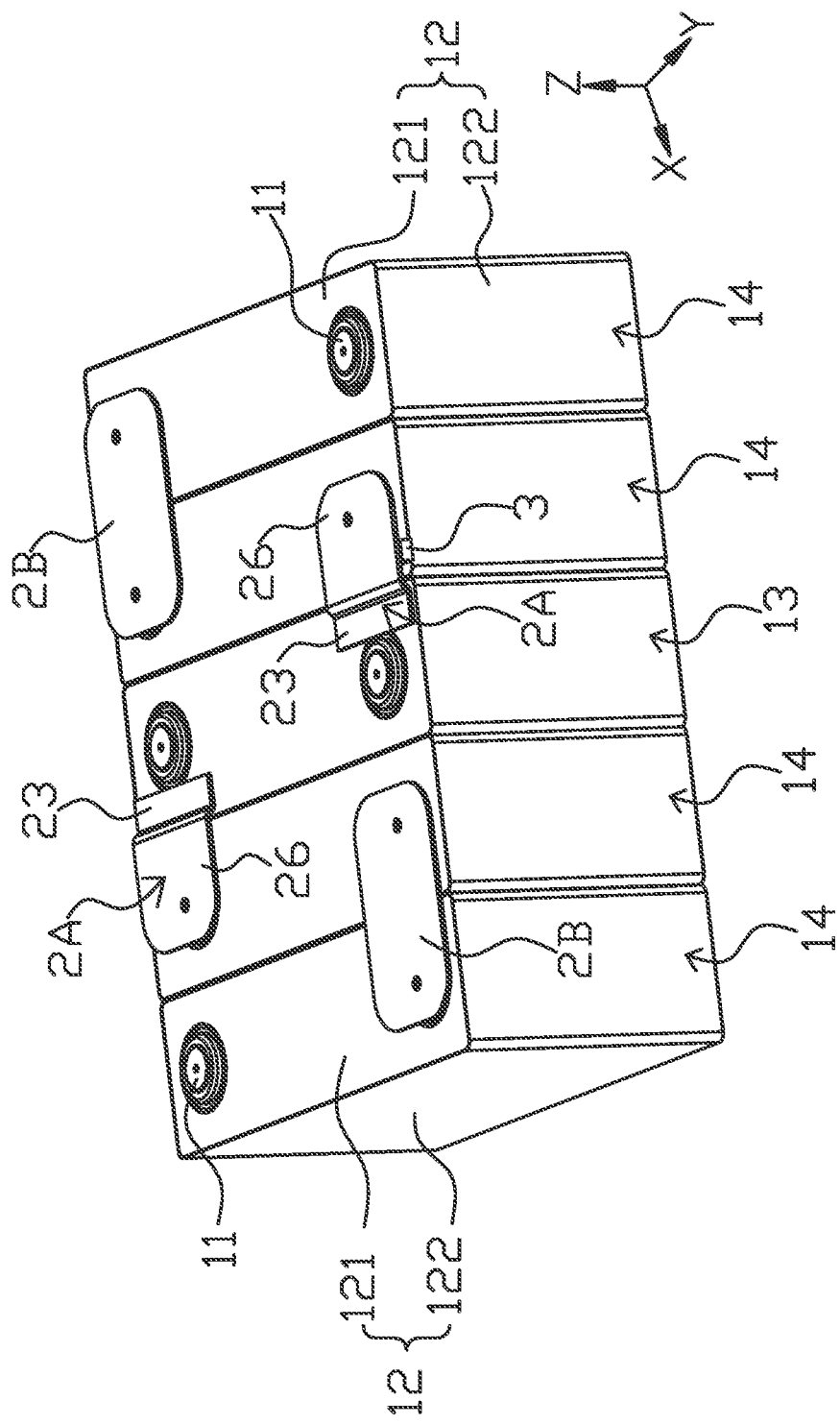
FIG. 10 is a schematic diagram of a local structure of the battery module of FIG. 2 in a fifth specific embodiment.

In another specific embodiment, as shown in FIG. 10, the first connecting piece 2A includes a first connecting portion 23 and a conductive portion 26, but does not include the foregoing second connecting portion connected to the electrode terminal 11 of the failed battery cell 13.

In this embodiment, when thickness of a connecting piece of the battery module is relatively large and ductility is relatively small, bending of the first connecting piece 2A is not easy to be implemented only based on the ductility of the connecting piece itself. Moreover, there is a large pulling force on connection between the first connecting piece 2A and the electrode terminal 11. Under the pulling force, there is a risk that connection between the first connecting piece 2A and the electrode terminal 11 of the non-failed battery cell 14 fails. To facilitate bending of the first connecting piece 2A and ensure connection reliability between an electrode terminal 11 of a non-failed battery cell 14 and the conductive portion 26 of the first connecting piece 2A, before bending of the first connecting piece 2A, the second connecting portion connected to the electrode terminal 11 of the failed battery cell 13 may be removed (for example, cut off).

In this embodiment, the first connecting piece 2A with the second connecting portion removed is more easy to bend, and in a bending process, a pulling force between the conductive portion 26 and the electrode terminal 11 of the non-failed battery cell 14 is relatively small, so that the connection reliability can be improved. In addition, when the second connecting portion is removed, a weight of the battery module can be reduced and energy density can be increased.

In the embodiments shown in FIG. 5 to FIG. 10, the first connecting portion 23 and the conductive portion 26 in the first connecting piece 2A are directly connected. Alternatively, of course, the first connecting portion 23 and the conductive portion 26 may be indirectly connected.

Figure 11:
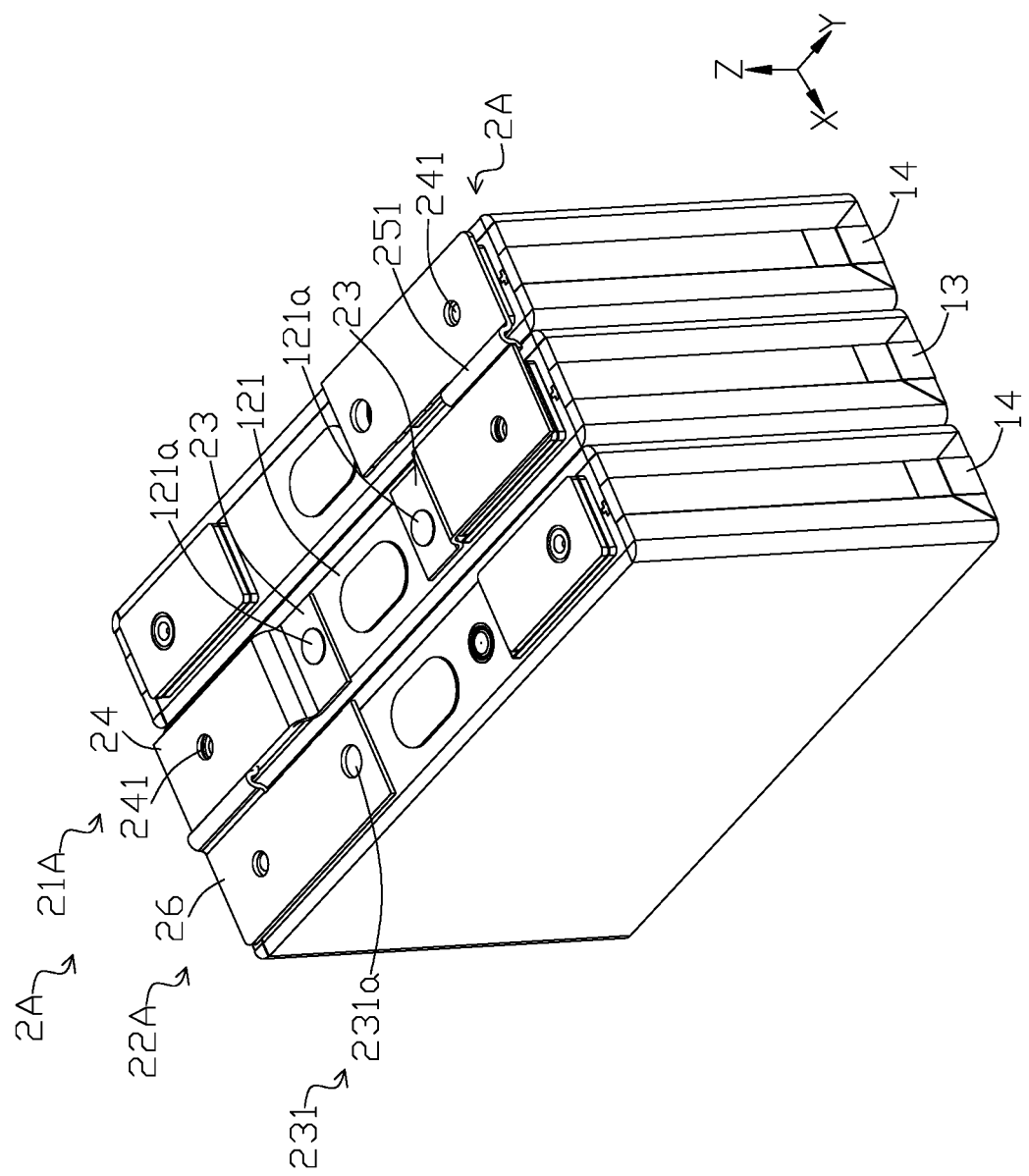
FIG. 11 is a schematic structural diagram of the first connecting piece in FIG. 10.

Specifically, as shown in FIG. 11, in the first connecting piece 2A, a conductive portion 26 and a first connecting portion 23 are indirectly connected by using a second connecting portion 24, where the second connecting portion 24 may be a part connected to an electrode terminal of a failed battery cell 13. In addition, the first connecting piece 2A includes a first portion 21A and a second portion 22A. The first portion 21A is configured to be connected to an enclosure 12 of the failed battery cell 13, and the second portion 22A is configured to be connected to a battery cell (which may be a failed battery cell 13 or a non-failed battery cell 14) adjacent to the failed battery cell 13.

When the battery cell adjacent to the failed battery cell 13 is a failed battery cell 13, the first portion 21A and the second portion 22A of the first connecting piece 2A have a same structure (same structure means that both the first portion 21A and the second portion 22A include a first connecting portion 23 and a conductive portion 26, but structures of the first connecting portion 23 and/or the conductive portion 26 of both may be different). When the battery cell adjacent to the failed battery cell 13 is a non-failed battery cell 14, the first portion 21A and the second portion 22A of the first connecting piece 2A have different structures. The following uses an example in which the battery cell adjacent to the failed battery cell 13 is a non-failed battery cell 14 (that is, the first portion 21A and the second portion 22A have different structures) for description, that is, the first portion 21A of the first connecting piece 2A is connected to the enclosure 12 of the failed battery cell 13, and the second portion 22A is connected to an electrode terminal 11 of the non-failed battery cell 14.

Figure 12:
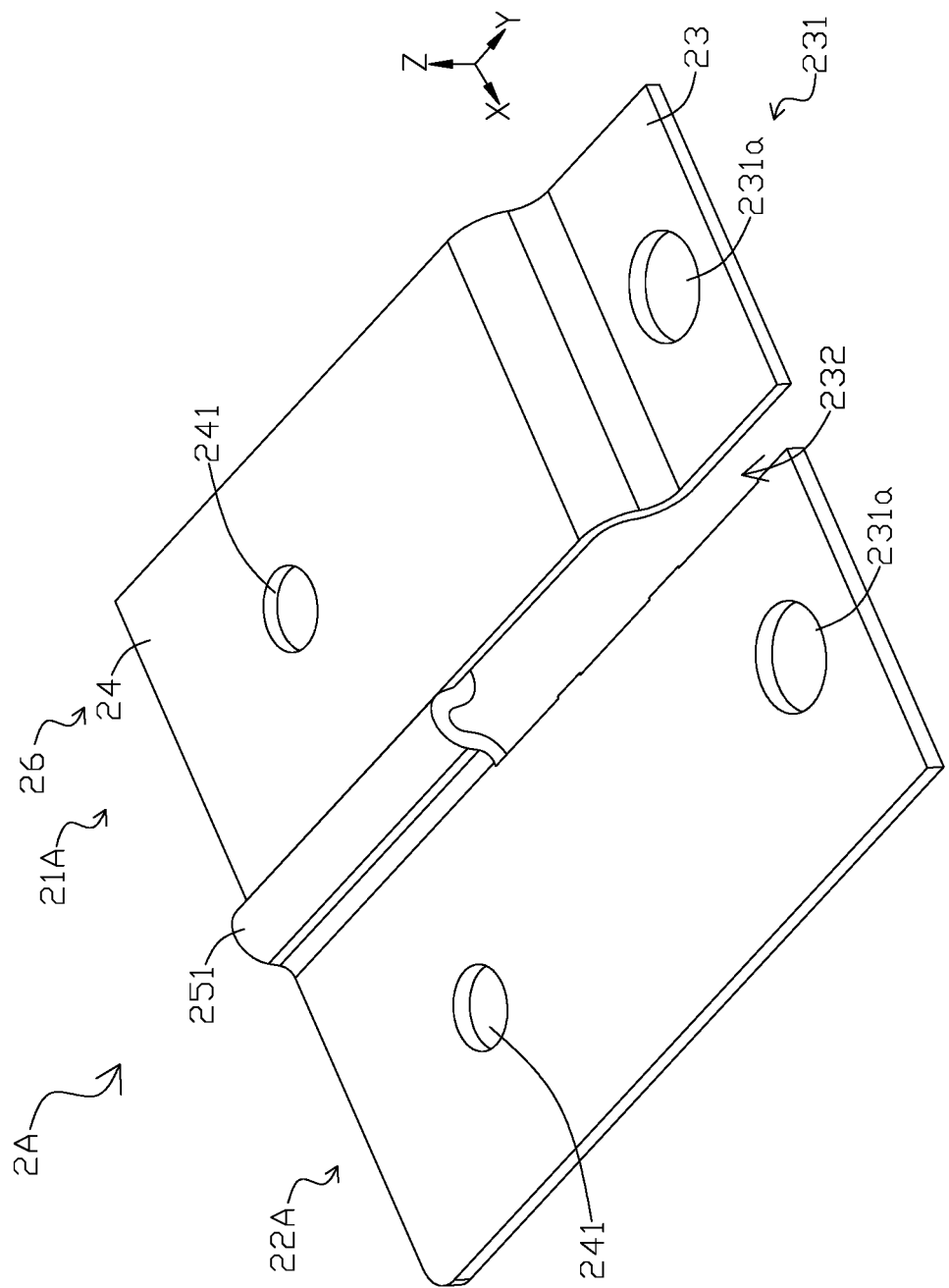
FIG. 12 is a section view along the line B-B of FIG. 3.

In the embodiment shown in FIG. 12, the first connecting piece 2A further includes a connecting portion 251. The connecting portion 251 is located between the first connecting portion 23 and the second portion 22A and is connected to both the first connecting portion 23 and the second portion 22A. When the first portion 21A of the first connecting piece 2A is configured to be connected to a top cover of a failed battery cell, the first portion 21A and the second portion 22A are arranged along the thickness direction X of the battery cells, and the connecting portion 251 is located between the first portion 21A and the second portion 22A.

The first portion 21A includes the first connecting portion 23, and the first portion 21A may further include a second connecting portion 24 (or may not include the second connecting portion 24) connected to an electrode terminal of the failed battery cell. Along the thickness direction X of the battery cells, the first connecting portion 23 is not connected to the second portion 22A. Moreover, along the thickness direction X of the battery cells, there is a first preset space 232 between the first connecting portion 23 and the second portion 22A, so that the second portion 22A does not affect connection between the first connecting portion 23 and the top cover of the failed battery cell.

In this embodiment, in the first connecting piece 2A, when the first connecting portion 23 is not connected to the second portion 22A, the connection between the first connecting portion 23 and the top cover can be easily implemented. Moreover, the second portion 22A does not affect the connection between the first connecting portion 23 and the top cover, improving connection reliability of the top cover and the first portion 21A.

More specifically, as shown in FIG. 12, the connecting portion 251 has an arc-shaped cross section along a height direction Z of the battery cells, and the connecting portion 251 can be deformed. When there is vibration in a working process of the battery module, the connecting portion 251 can buffer impact load on the first connecting piece 2A, thereby improving structural strength of the first connecting piece 2A and improving connection reliability between the first connecting piece 2A and the electrode terminal and the top cover of the failed battery cell. In addition, an expansion force exists in the working process of the battery cells, and the expansion force in the thickness direction X of the battery cells is relatively large. In this case, the connecting portion 251 can be deformed along the thickness direction X of the battery cells, so as to buffer the expansion force of the first connecting piece 2A.

In conclusion, in the embodiment shown in FIG. 12, the first portion 21A of the first connecting piece 2A is configured to be connected to an enclosure of a failed battery cell, and the second portion 22A is configured to be connected to a non-failed battery cell. In this case, the first portion 21A includes a first connecting portion 23 and a conductive portion 26 that are bent relative to each other, where the first connecting portion 23 is configured to be connected with the enclosure. In addition, the second portion 22A has a flatplate structure and is provided with a through hole 231a and a via 241. When a battery cell connected to the second portion 22A fails, the through hole 231a is configured to be connected to a top cover of the failed battery cell, and the via 241 is connected to an electrode terminal of the battery cell.

In another specific embodiment, when both a first portion 21A and a second portion 22A of the first connecting piece 2A are configured to be connected to a failed battery cell, the first portion 21A and the second portion 22A have a same structure (both have the structure of the first connecting portion 21A shown in FIG. 12). Both the first portion 21A and the second portion 22A include a first connecting portion 23 and a conductive portion 26 that are bent relative to each other. The first connecting portions 23 of the first portion 21A and the second portion 22A are configured to be connected to an enclosure of the failed battery cell, and the conductive portions 26 of the first portion 21A and the second portion 22A are connected to each other and are configured to be connected to a non-failed battery cell.

As described above, in failure of the battery module, one or more failed battery cells are included, and a non-failed battery cell is further included. To enable the battery module to work normally, in the failed battery cell, a connecting piece connected to the failed battery cell needs to be connected to an enclosure of the failed battery cell, and the connecting piece connected to the failed battery cell is the first connecting piece 2A shown in FIG. 12. In the non-failed battery cell, a connecting piece connected to the non-failed battery cell cannot be connected to an enclosure of each battery cell, and the connecting piece connected to the non-failed battery cell is the second connecting piece 2B shown in FIG. 13 to FIG. 17, that is, when there is a failed battery cell in the battery module, the battery module includes the first connecting piece and the second connecting piece 2B. When there is no failed battery cell in the battery module, the battery module includes only the second connecting piece 2B. A specific structure of the second connecting piece 2B is described in the following embodiments.

Figure 13:
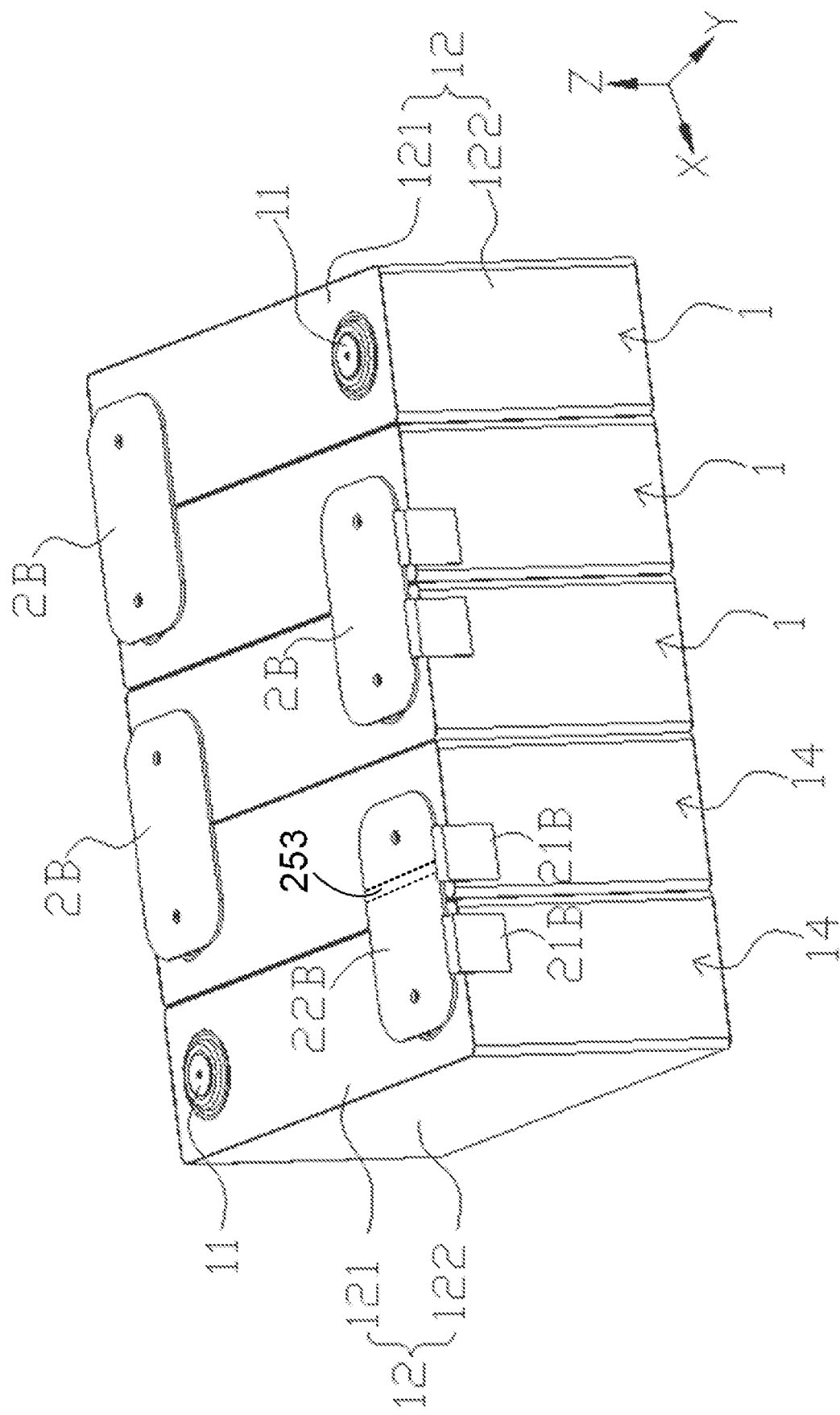
FIG. 13 is a locally enlarged view of part II in FIG. 12.

A structure of a second connecting piece 2B connected to a non-failed battery cell 14 in the battery module is described in the following embodiments. As shown in FIG. 13, the second connecting piece 2B includes a third portion 21B and a fourth portion 22B. The third portion 21B and the fourth portion 22B are respectively connected to two non-failed battery cells, and the third portion 21B and the fourth portion 22B may include a bending guide portion 253. The bending guide portion 253 is configured to guide the second connecting piece 2B to bend and form a first connecting portion 23 and a conductive portion 26 that are bent relative to each other.

Figure 14:
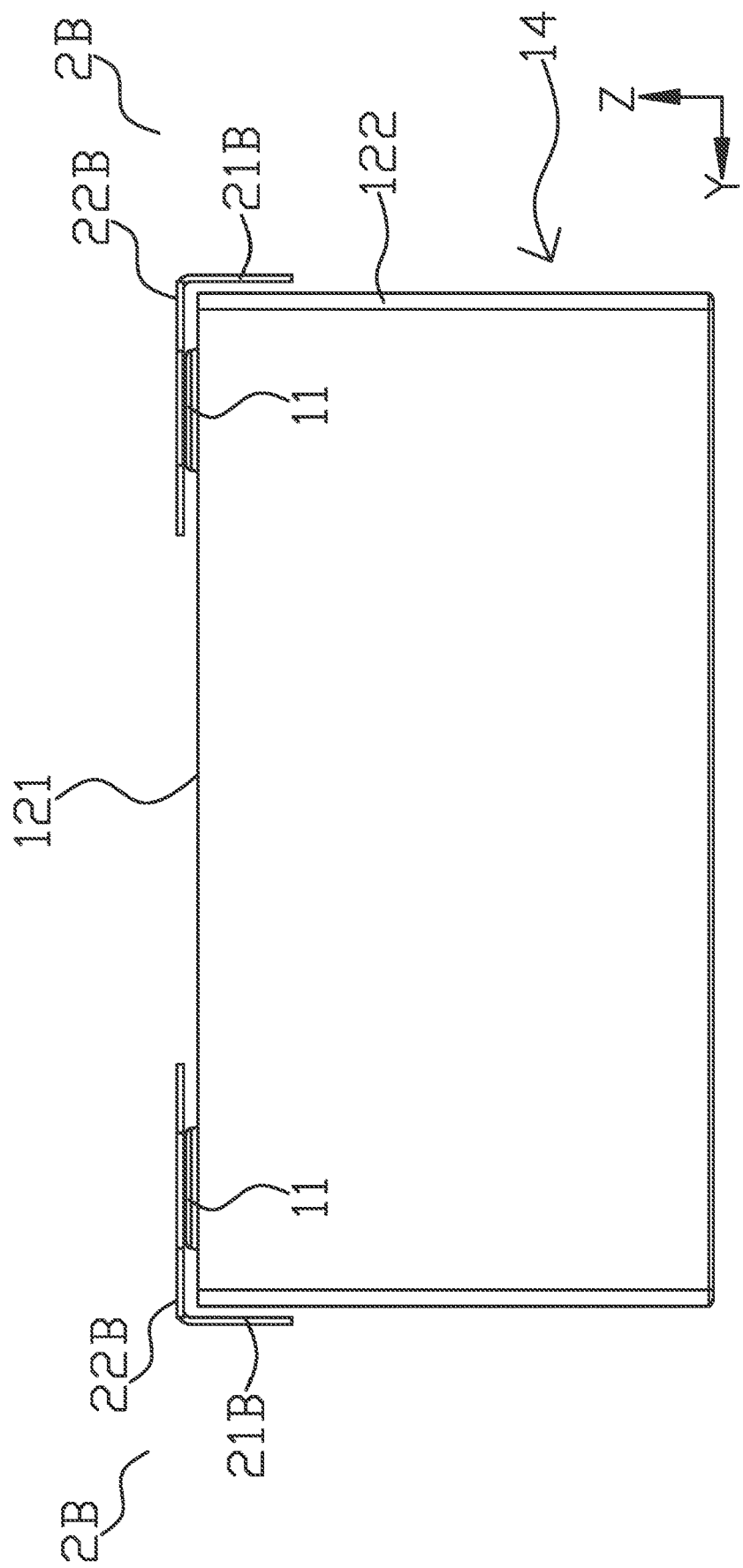
FIG. 14 is a schematic structural diagram of the second connecting piece in FIG. 12.

In a specific embodiment, as shown in FIGS. 13 and 14, the battery module includes a plurality of non-failed battery cells 14, and the plurality of non-failed battery cells 14 are connected in series by using second connecting pieces 2B. In the embodiments shown in FIGS. 13 and 14, the second connecting piece 2B includes a third portion 21B and a fourth portion 22B, where the fourth portion 22B is electrically connected to the electrode terminal 11 of the non-failed battery cell 14, and the third portion 21B is bent along a bending guide portion 253.

Therefore, in this embodiment, when a battery cell connected to the second connecting piece 2B fails, the second connecting piece 2B can be connected to an enclosure of a failed battery cell. Specifically, as shown in FIG. 13, when failure treatment is performed, the third portion 21B of the second connecting piece 2B can be bent in a direction of a housing 122, so as to connect to the housing 122 of the failed battery cell; or the fourth portion 22B of the second connecting piece 2B can be bent in a direction of a top cover 121, so as to connect to the top cover 121 of the failed battery cell.

In addition, as shown in FIG. 13, because the second connecting piece 2B is configured to connect two adjacent battery cells in series, the second connecting piece 2B in this embodiment may include two third portions 21B, and the two third portions 21B are respectively corresponding to housings 122 of the two battery cells connected in series by using the second connecting piece 2B.

Figure 15:
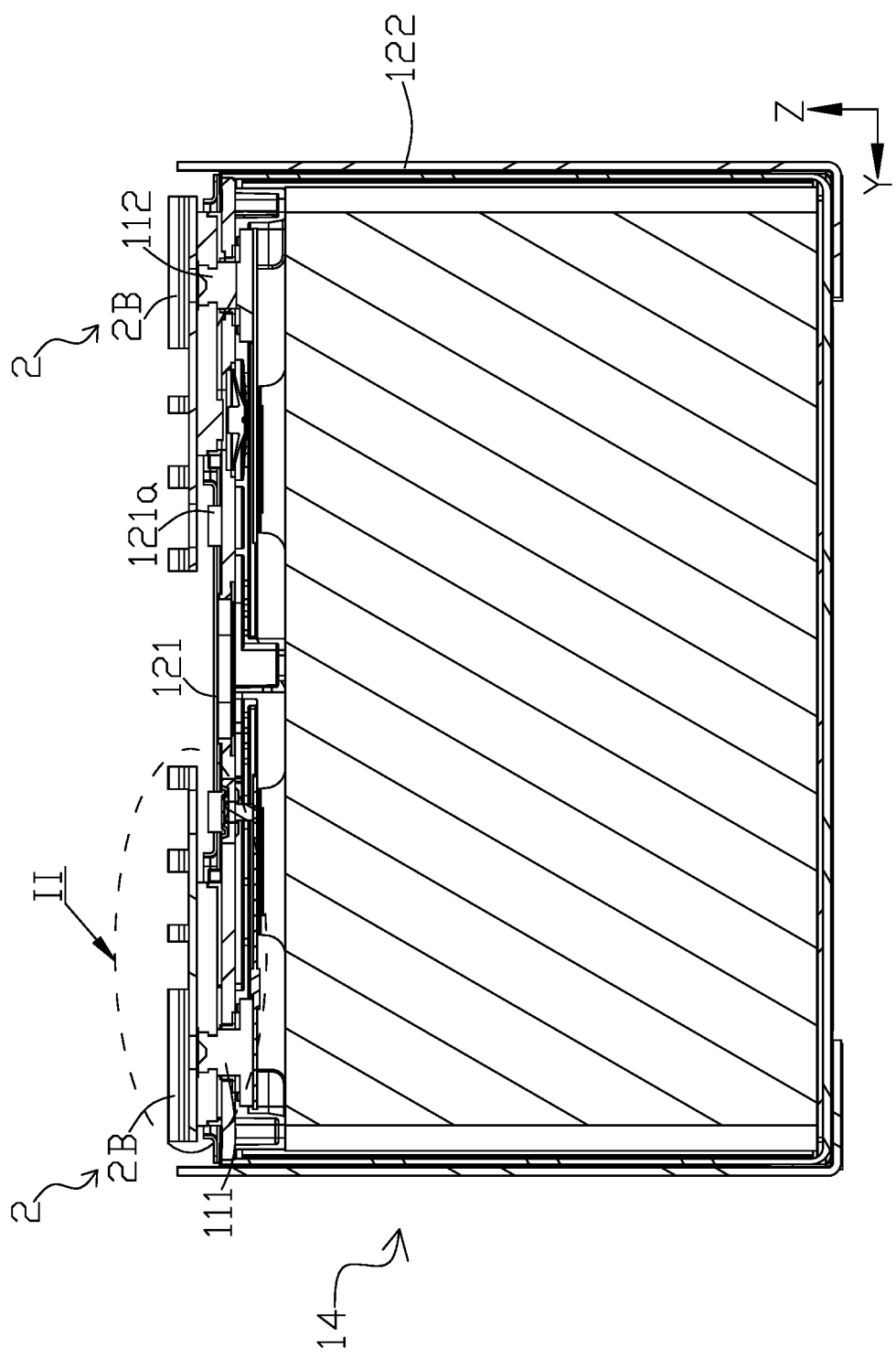
FIG. 15 is a schematic diagram of a local structure of the battery module of FIG. 2 in a sixth specific embodiment.

In another specific embodiment, in an embodiment shown in FIG. 15, a third portion 21B and a fourth portion 22B of the second connecting piece 2B are respectively connected to a first electrode terminal 111 and a second electrode terminal 112 of an adjacent non-failed battery cell 14. When a battery cell connected to the second connecting piece 2B fails, the third portion 21B and/or the fourth portion 22B can bend in a direction of a top cover 121, thereby implementing electrical connection to the top cover 121.

Figure 16:
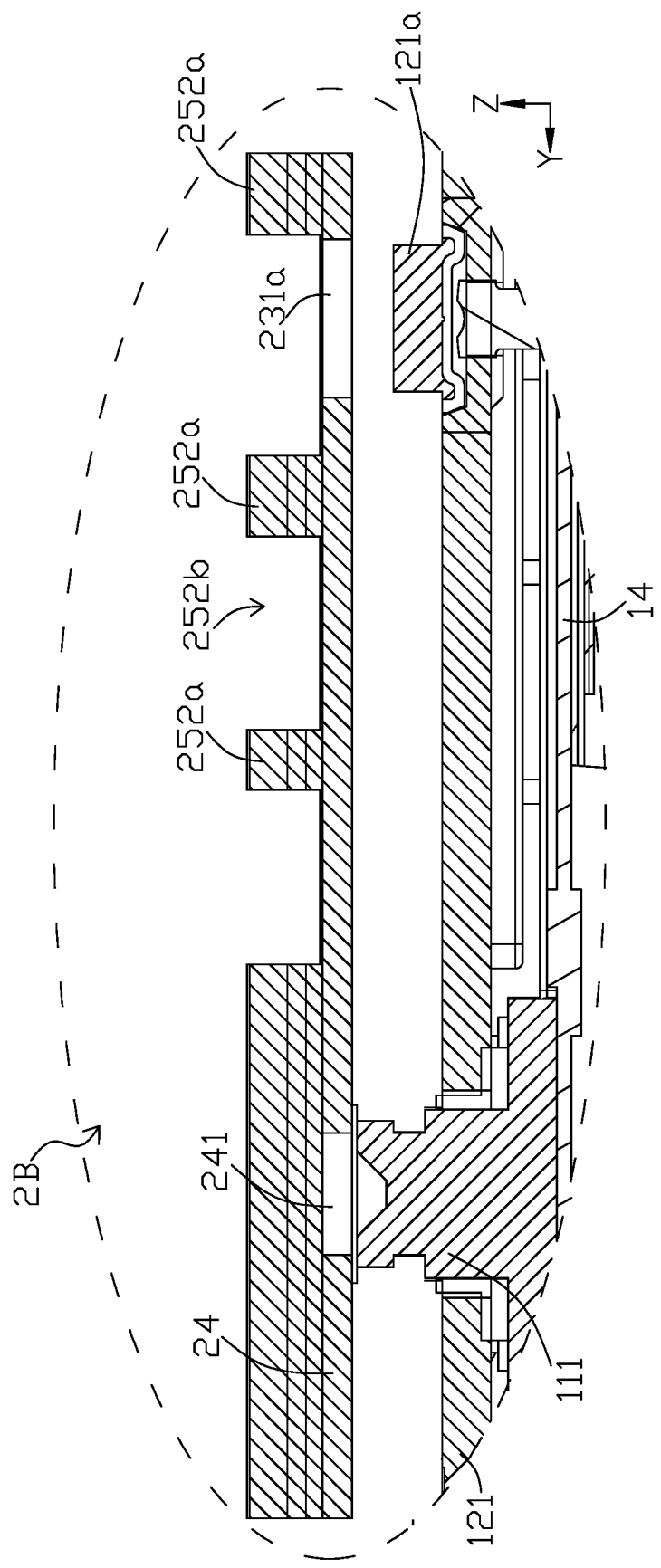
FIG. 16 is a side view of FIG. 15.

In a possible design, as shown in FIG. 16, both a third portion and a fourth portion of the second connecting piece 2B are provided with a through hole 231a. The third portion is used as an example. A top cover 121 of a non-failed battery cell 14 is provided with a raised portion 121a. When a battery cell does not fail, there is a gap between the through hole 231a and the raised portion 121a in a height direction Z of the battery cell (that is, the third portion is not connected to the top cover 121). When the battery cell fails, the through hole 231a can be connected to the raised portion 121a.

In addition, as shown in FIG. 16, in the second connecting piece 2B, along the height direction Z of the battery cell, the through hole 231a has a first axis (the through hole 231a is symmetrically distributed with respect to the first axis). The raised portion 121a has a second axis (the raised portion 121a is symmetrically distributed with respect to the second axis). A connection line between the first axis and the second axis is arranged along a length direction Y, that is, the through hole 231a and the raised portion 121a are arranged along the length direction Y. Moreover, along the height direction Z of the battery cell, a projection of the through hole 231a and a projection of the raised portion 121a may partially overlap, or may not overlap, provided that when the third portion 21B is bent along the height direction Z of the battery cell and forms the foregoing first connecting portion and conductive portion, at least part of the raised portion 121a can pass through the through hole 231a and is connected to the side wall of the through hole 231a.

Therefore, a top cover of each battery cell in the battery module may be provided with the foregoing raised portion, and each connecting piece may be provided with the foregoing through hole.

Figure 17:
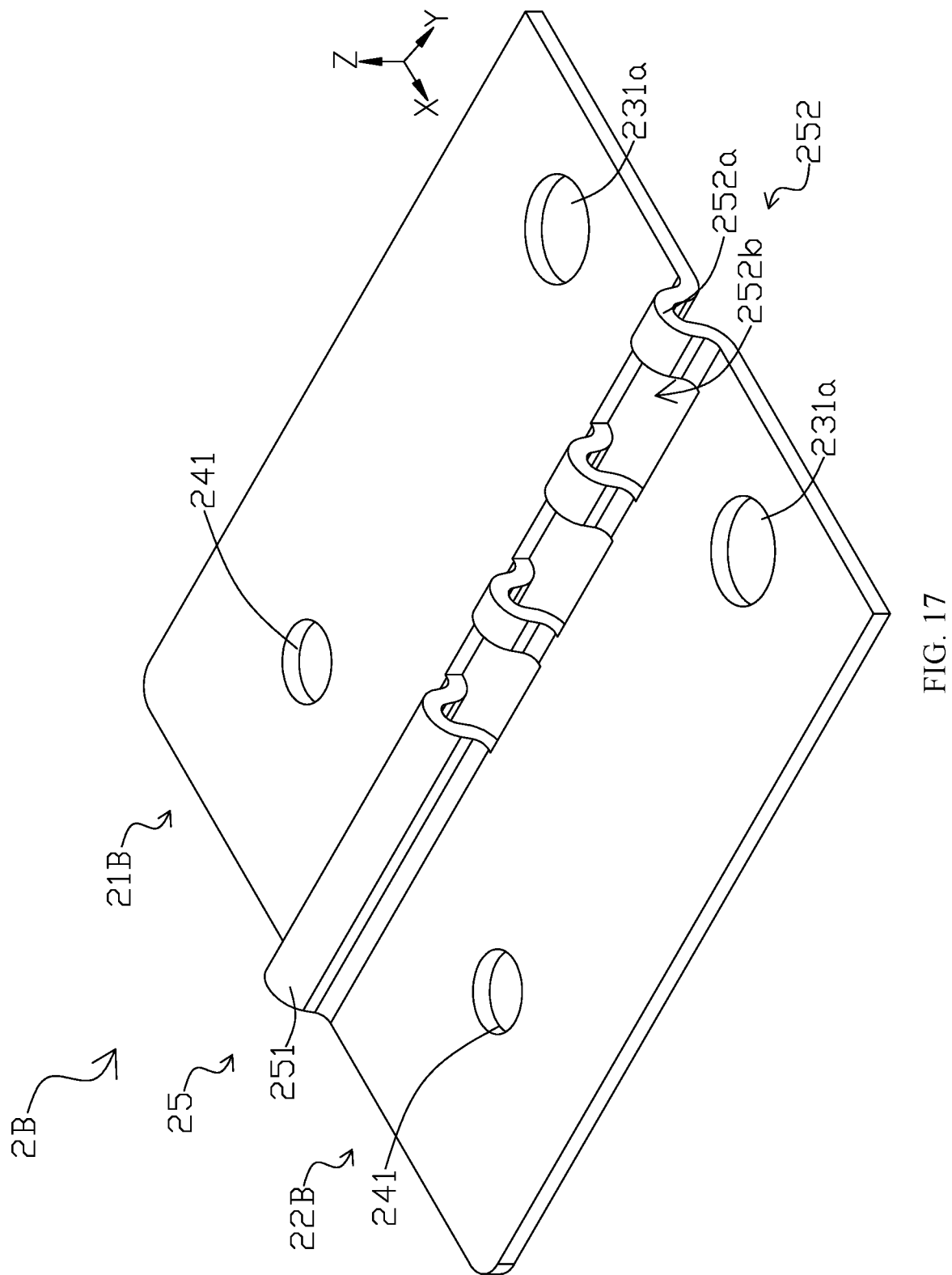
FIG. 17 is a schematic diagram of a local structure of the battery module of FIG. 2 in a seventh specific embodiment.

In a possible design, as shown in FIG. 17, the second connecting piece 2B may further include an intermediate component 25 connecting a third portion 21B and a fourth portion 22B. Specifically, the intermediate component 25 may include a connecting portion 251 and a fracture guide portion 252. At least one of the connection between the fracture guide portion 252 and the third portion 21B, the connection between the fracture guide portion 252 and the fourth portion 22B, and the fracture guide portion 252 can be broken along a thickness direction X of battery cells. The fracture guide portion 252 may be provided with a weak portion, so that the fracture guide portion 252 can be broken along the weak portion.

In this embodiment, when the fracture guide portion 252 fractures, there are the following cases: Case 1: The fracture guide portion 252 is disconnected from the third portion 21B, but is not disconnected from the fourth portion 22B. Case 2: The fracture guide portion 252 is disconnected from the fourth portion 22B, but is not disconnected from the third portion 21B. Case 3: The fracture guide portion 252 is disconnected from both the third portion 21B and the fourth portion 22B, which is equivalent to removing the fracture component 252 from the second connecting piece 2B. Case 4: The fracture guide portion 252 itself is broken. After the fracture guide portion 252 is broken, two fractured parts are formed, and the two parts are connected to the third portion 21B and the fourth portion 22B, respectively. Of course, it may also be any combination of the foregoing four cases, this application does not limit a specific location of fracture.

When a battery cell connected to the second connecting piece 2B fails, a structure of the second connecting piece 2B needs to be changed into the structure of the first connecting piece, so as to make the failed battery cell short-circuit. In the second connecting piece 2B, when the fracture guide portion 252 is disconnected from the third portion 21B and/or the fourth portion 22B, it is convenient to implement that the third portion 21B is bent downward in the height direction Z of the battery cell, thereby facilitating connection between the first connecting piece and a top cover. In addition, by setting the fracture guide portion 252, when the battery cell connected to the second connecting piece 2B does not fail, the fracture guide portion 252 can connect the third portion 21B and the fourth portion 22B along the thickness direction X, thereby improving structural strength of the second connecting piece 2B and increasing an overcurrent area of the second connecting piece 2B.

Specifically, as shown in FIG. 17, the fracture guide portion 252 may include a plurality of bending structures 252a raising in a height direction Z of the battery cell. Specifically, the bending structures 252a may be raised upward, and each bending structure 252a is arranged at intervals in a length direction Y. There is a second preset space 252b between adjacent bending structures 252a, and each bending structure 252a can be deformed. More specifically, the bent structure 252a may have an arc-shaped cross section along a height direction Z.

When there is vibration in a working process of the battery module, the fracture guide portion 252 can be deformed to buffer impact load on the second connecting piece 2B. In addition, when there is expansion in the working process of the battery module, the second connecting piece 2B is subjected to an expansion force. In this case, deformation of the fracture guide portion 252 can buffer the expansion force received by the second connecting piece 2B, thereby reducing a risk of the second connecting piece 2B being disconnected from an electrode terminal.

In addition, in the fracture guide portion 252, the second preset space 252b between adjacent bending structures 252a makes the bending structures 252a easier to deform and more convenient to disconnect the fracture component 252 from the third portion 21B and/or the fourth portion 22B, thereby improving efficiency of failure treatment. In addition, the second preset space 252b between the adjacent bending structures 252a can also reduce a weight of the second connecting piece 2B, thereby improving energy density of the battery module.

More specifically, as shown in FIG. 17, in the second connecting piece 2B, the connecting portion 251 connecting the third portion 21B and the fourth portion 22B has an arc-shaped cross section along the height direction Z, and the connecting portion 252 can be deformed to buffer a force between the third portion 21B and the fourth portion 22B.

In conclusion, the second connecting piece 2B of the battery module has a larger size in the length direction Y than a connecting piece used only to connect an electrode terminal in the prior art, so that the overcurrent area of the second connecting piece 2B is larger. In addition, in order to facilitate bending operation on the third portion 21B of the second connecting piece 2B, a material of the second connecting piece 2B may be aluminum, which has a relatively small hardness and is easy to deform.

In another specific embodiment, each connecting piece of the battery module may be a common plate-like structure on the market, that is, each connecting piece may not be configured with a structure such as a bending guide portion, or a fracture guide portion. When the battery module fails, a connecting piece connected to a failed battery cell is replaced with a second connecting piece provided with features such as a bending guide portion and a fracture guide portion (the structure of the second connecting piece is as described in any one of the foregoing embodiments). A specific replacement method is as follows: Remove the connecting piece connected to the failed battery cell from the battery module, connect the second connecting piece to an electrode terminal of the failed battery cell, then perform operations such as bending and fracturing on the second connecting piece to form a first connecting piece, and connect the first connecting piece to an enclosure of the failed battery cell, so as to implement failure treatment of the failed battery cell and restore the battery module to work.

In addition, an embodiment of this application further provides a failure treatment method for processing a failed battery cell 13, where the failure treatment method specifically includes the following steps:

S3: Electrically connect a connecting piece 2 connected to the failed battery cell 13 to an enclosure 12 of the failed battery cell 13.

In this embodiment, as shown in FIG. 4, a positive terminal 111 and a negative terminal 112 of the failed battery cell 13 are connected to the enclosure 12 by using a first connecting piece 2A, and thus the failed battery cell 13 is short-circuited and the failed battery cell 13 is no longer involved in charging and discharging processes of a battery module, that is, the failed battery cell 13 does not affect a circuit of the battery module. Therefore, when one or more failed battery cells 13 exist in a working process of the battery module, only a first connecting piece 2A connected to each failed battery cell 13 needs to be connected to an enclosure 12 of the failed battery cell 13 without replacing an entire battery module. When the battery module is applied to a vehicle, the vehicle can be directly repaired in a 4S store without the need to return the entire vehicle to the factory or replace a new battery pack, thereby improving maintenance efficiency of the battery module and simplifying a maintenance process and maintenance costs. In addition, after the foregoing processing, only a small quantity of single battery cells (single battery cells of the failed battery cell 13) in the battery module do not participate in formation of a circuit, which does not cause a large reduction in battery capacity of the battery module, so that the battery module and the battery pack can work normally.

Specifically, as described above, an enclosure 12 of a battery cell includes a housing 122 and a top cover 121 connected to the housing 122. Based on this, the foregoing step S3 may specifically include:

S31: Connect the connecting piece 2 connected to the failed battery cell 13 to the housing 122 or a top cover 121 of the failed battery cell 13.

In this embodiment, before the connecting piece 2 is connected to the top cover 121 or the housing 122 of the failed battery cell 13, the connecting piece 2 may be specifically the second connecting piece 2B described in the foregoing embodiments, and after the connecting piece 2 is connected to the top cover 121 or the housing 122 of the failed battery cell 13, the connecting piece 2 may be specifically the first connecting piece 2A described in the foregoing embodiments.

In a possible design, before step S3, the failure treatment method may further include:

S2: Bend the connecting piece 2 connected to the failed battery cell 13, and form a first connecting portion 23 after bending, where the first connecting portion 23 is configured to be connected to the enclosure 12 of the failed battery cell 13.

In this embodiment, a specific structure of the first connecting portion 23 formed after the connecting piece 2 is bent is described in the foregoing embodiments. In addition, in a maintenance process, it only needs to bend the connecting piece 2, and then connect the first connecting portion 23 of the connecting piece 2 to the enclosure 12 of the failed battery cell 13. Therefore, a processing procedure of the failed battery cell 13 is simple, maintenance costs are relatively low, and working efficiency of the battery module M2 can be improved.

Figure 18:
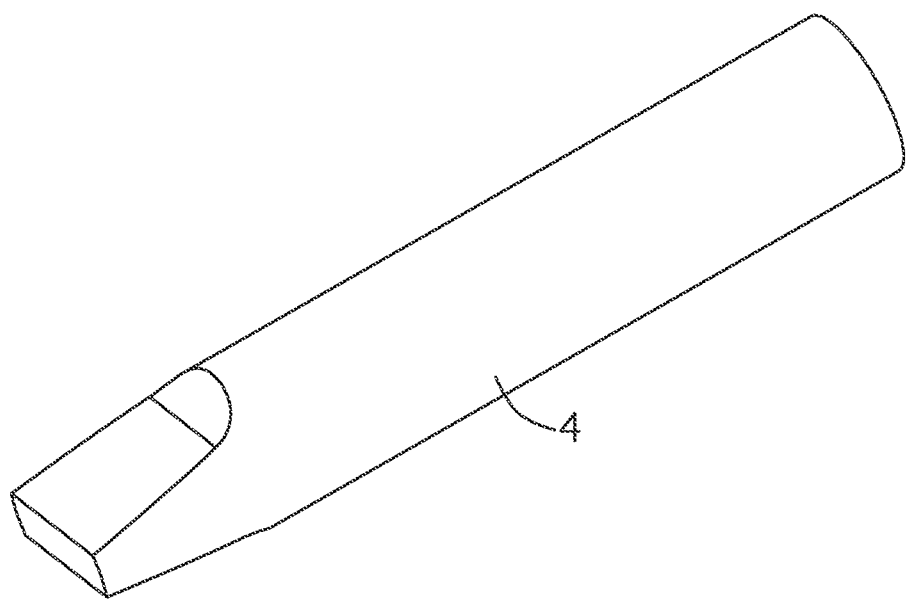
FIG. 18 is a schematic structural diagram of a wide chisel according to an embodiment of this application.

In this embodiment, a wide chisel 4 shown in FIG. 18 may be used to bend the connecting piece 2 connected to the failed battery cell 13. During operation, the wide chisel 4 may be used to apply pressure to the connecting piece 2 at a preset position of the connecting piece 2. Moreover, a contact area between the wide chisel 4 and the connecting piece 2 is relatively large, and a pressure applied to the connecting piece 2 is relatively small, so that the connecting piece 2 can be prevented from being broken by the wide chisel 4. Under the pressure of the wide chisel 4, the connecting piece 2 is bent toward the enclosure 12 of the failed battery cell 13.

In addition, in order to facilitate bending and improving accuracy of bending, a bending guide portion (for example, a crease) may be provided at a preset position of the connecting piece 2. During a bending operation, the wide chisel 4 may be corresponding to a position of the crease. After pressure is applied by the wide chisel 4, the connecting piece 2 can be bent along the crease.

In a specific embodiment, before maintenance processing, the connecting piece 2 connected to the failed battery cell 13 may be specifically the second connecting piece 2B described in the foregoing embodiments. The second connecting piece 2B includes a bending guide portion. Therefore, the foregoing step S2 may specifically include:

S22. Bend the second connecting piece 2B along the bending guide portion to form the first connecting portion 23 and a conductive portion 26.

Specifically, the second connecting piece 2B includes a third portion 21B and a fourth portion 22B, where the third portion 21B is connected to the failed battery cell 13, the fourth portion 22B is connected to a non-failed battery cell 14, or the fourth portion 22B is connected to another failed battery cell 13. That the third portion 21B is connected to the failed battery cell 13, and the fourth portion 22B is connected to a non-failed battery cell 14 is used as an example. The foregoing step S22 may specifically include:

S221. Bend the third portion 21B along a bending guide portion provided in the third portion 21B, and form a first portion 21A including the first connecting portion 23 and a second connecting portion 24 after bending, where the first portion 21A may be a structure described in the foregoing embodiments.

More specifically, before maintenance processing, the connecting piece 2 connected to the failed battery cell 13 may be specifically the second connecting piece 2B described in the foregoing embodiments. The second connecting piece 2B may further include an intermediate component 25 for connecting the third portion 21B and the fourth portion 22B, and the intermediate component 25 includes a fracture guide portion 252 and a connecting portion 251. Based on this, before step S22, the failure handling method may further include:

S21: Disconnect the fracture guide portion 252. After disconnection, the fourth portion 22B is the second portion 22A in the foregoing embodiments.

Specifically, when the fracture guide portion 252 is disconnected, at least one of the connection between the fracture guide portion 252 and the third portion 21B, the connection between the fracture guide portion 252 and the fourth portion 22B, and the fracture guide portion 252 may be broken. In addition, the fracture guide portion 252 may be provided with a weak structure. In this case, the fracture guide portion 252 may be disconnected along the weak structure.

In this embodiment, after the connection between the fracture guide portion 252 and the third portion 21B and/or the fourth portion 22B is broken, the third portion 21B is easily deformed. Therefore, the third portion 21B can be easily bent to form the first connecting portion 23 and the second connecting portion 24 that are bent relative to each other, thereby facilitating connection of the first connecting portion 23 with the enclosure 12 of the failed battery cell 13, and completing treatment of the failed battery cell 13. Moreover, a structure obtained after failure treatment does not increase a size of the battery module M along a thickness direction X, a length direction Y and a height direction Z, thus avoiding interference with another component of the battery module M2.

It can be understood that in this embodiment of this application, when battery cells 1 fail, after treatment is performed on the failed battery cell 13, a structure of the second connecting piece 2B that is connected to the failed battery cell 13 can be converted into a structure of the first connecting piece 2A, that is, the second connecting piece 2B shown in FIG. 17 is a structure obtained before the failure treatment. Moreover, one of the battery cells 1 that is connected to the connecting piece 2 (the second connecting piece 2B) is failed and the other is not failed. In this case, the third portion 21B that is connected to the failed battery cell 13 is operated as described above. That is, after the fracture guide portion 252 is disconnected from the third portion 21B and/or the fourth portion 22B, the third portion 21B is bent to form the first portion 21A including the first connecting portion 23 and the second connecting portion 24A, and the fourth portion 22B that is connected to the non-failed battery cell 14 does not need to be bent and forms the first connecting piece 2A shown in FIG. 12 (a structure after failure treatment). After treatment, the third portion 21B becomes the first portion 21A, and the fourth portion 22B becomes the second part 22A (the structure is not changed).

In addition, when two adjacent battery cells 1 fail, both the third portion 21B and the fourth portion 22B of the connecting piece 2 (the second connecting piece 2B) connected to the two failed battery cells 1 need to be operated as described above. That is, after the fracture guide portion 252 is disconnected from the third portion 21B and/or the fourth portion 22B, both the third portion 21B and the fourth portion 22B are bent to form the first portion 21A including the first connecting portion 23 and the second connecting portion 24A, and form the first connecting piece 2A of another embodiment. After treatment, both the third portion 21B and the fourth portion 22B become the first portion 21A.

Therefore, a structure of the first connecting piece 2A after failure treatment varies depending on a quantity of the failed battery cells 13 connected to the connecting piece.

In a specific embodiment, one of the first connecting portion 23 and the enclosure 12 of the failed battery cell 13 is provided with a raised portion 121a, and the other is provided with a recessed portion 231. Based on this, the foregoing step S31 may specifically include:

S311: Connect the raised portion 121a to the recessed portion 231.

In this embodiment, the raised portion 121a and the recessed portion 231 that can matched with each other are set, so that connection reliability between the first connecting portion 23 and the enclosure 12 of the battery cell 13 can be further improved, thereby improving stability of a battery module.

More specifically, the raised portion 121a is disposed in the enclosure 12 of the failed battery cell 13, and the recessed portion 231 is disposed in a through hole 231a of the first connecting portion 23. Based on this, the foregoing step S311 may specifically include:

S311a: Pass the raised portion 121a through the through hole 231a, and connect the raised portion 121a to the through hole 231a by using a conductive material.

For example, the raised portion 121a and the sidewall of the through hole 231a may be welded, or the raised portion 121a and the sidewall of the through hole 231a may be connected by using a conductive adhesive, or may be connected by pouring a molten metal between the raised portion 121a and the through hole 231a.

Alternatively, a matching manner of the raised portion 121a and the through hole 231a may be as follows: The raised portion 121a and the sidewall of the through hole 231a are interference fit, so as to implement connection between the raised portion 121a and the through hole 231a. Alternatively, the raised portion 121a may be provided with a chuck groove. When the raised portion 121a passes through the through hole 231a, a part of the first connecting portion 23 is located in the chuck groove, so that the side wall of the chuck groove restricts a relative movement of the raised portion 121a and the first connecting portion 23 along a height direction Z of the battery cell, thereby implementing connection between the raised portion 121a and the through hole 231a. Alternatively, after the raised portion 121a passes through the through hole 231a, the raised portion 121a is deformed by pressing a portion of the raised portion 121a protruding from the first connecting portion 23, and abuts against an upper end face of the first connecting portion 23, thereby implementing connection between the raised portion 121a and the through hole 231a.

Alternatively, the first connecting portion 23 of the first connecting piece 2A may be riveted to the enclosure 12 of the failed battery cell 13. Moreover, when the first connecting portion 23 is riveted to the enclosure 12, a heat source does not need to be increased during connection, thereby reducing a risk of excessive temperature damage to battery cells when the heat source is introduced. In addition, the manner of riveting has advantages of simple operation, low maintenance costs and relatively low requirement for maintenance personnel.

Alternatively, the first connecting portion 23 of the first connecting piece 2A and the enclosure 12 of the failed battery cell 13 may be welded. In this case, reliability of mechanical connection and electrical connection therebetween are relatively high, thereby improving working reliability of a battery module. Besides, no metal shavings are generated during welding of the first connecting portion 23 and the enclosure 12, thereby avoiding a risk of short circuit caused by the metal shavings generated by maintenance entering the battery module. In addition, when the first connecting portion 23 is welded to the enclosure 12, openings on the first connecting portion 23 and the enclosure 12 can be avoided, thereby avoiding inactivation of the failed battery cell 13 or leakage of an electrolyte from the openings.

In this embodiment, when both the raised portion 121a and the through hole 231a have a circular cross section, the diameter of the raised portion 121a may be the same as or slightly larger than the diameter of the through hole 231a.

In a possible design, before step S2, the failure treatment method may further include:

S12. Disconnect an electrode terminal 11 of the failed battery cell 13 from at least one connecting piece 2 connected to the electrode terminal 11.

In this embodiment, when thickness of a connecting piece of the battery module is relatively large and ductility is relatively small, bending of the first connecting piece 2A is not easy to be implemented only based on the ductility of the connecting piece itself. Moreover, there is a large pulling force on connection between the first connecting piece 2A and the electrode terminal 11. Under the pulling force, there is a risk that connection between the first connecting piece 2A and the electrode terminal 11 of the non-failed battery cell 14 fails. To facilitate bending of the first connecting piece 2A and ensure connection reliability between an electrode terminal 11 of a non-failed battery cell 14 and a conductive portion 26 of the first connecting piece 2A, before bending of the first connecting piece 2A, a part (for example, a second connecting portion 24) connected to the electrode terminal 11 of the failed battery cell 13 may be removed (for example, cut off).

In this embodiment, the first connecting piece 2A with the second connecting portion 24 removed is more easy to bend, and in a bending process, a pulling force between the conductive portion 26 and the electrode terminal 11 of the non-failed battery cell 14 is relatively small, so that the connection reliability can be improved. In addition, when the second connecting portion 24 is removed, a weight of the battery module can be reduced and energy density can be increased.

Figure 19:
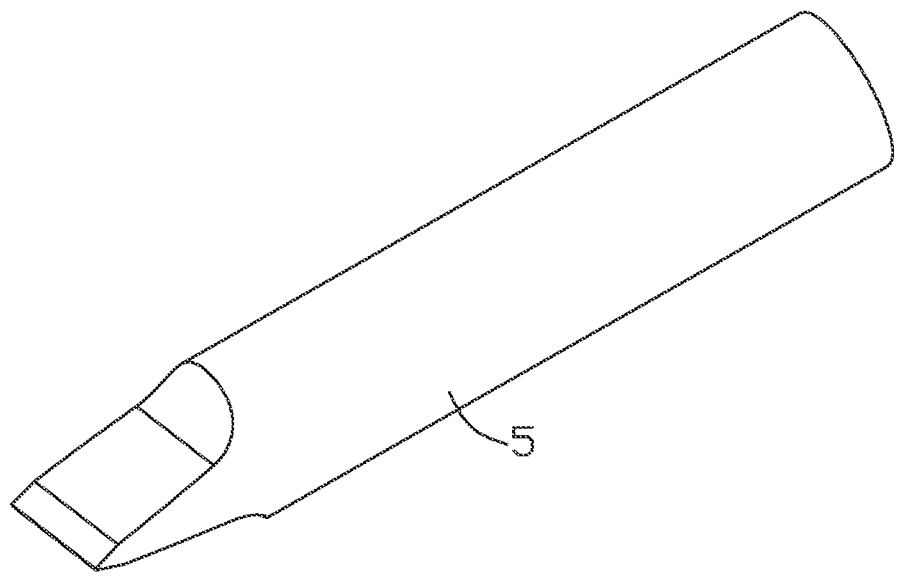
FIG. 19 is a schematic structural diagram of a narrow chisel according to an embodiment of this application.

In this embodiment, during removing of the second connecting portion 24, a narrow chisel 5 shown in FIG. 19 may be used. During operation, the narrow chisel 5 may be used to apply pressure to the connecting piece 2 at a preset position of the connecting piece 2. Moreover, because a contact area between the narrow chisel 5 and the connecting piece 2 is relatively small, and a pressure applied to the connecting piece 2 is relatively large, under the pressure of the narrow chisel 5, the connecting piece 2 can be disconnected along the preset position. After disconnection, the second connecting portion 24 can be removed (for example, cut off). In addition, to facilitate disconnection of the connecting piece 2, a crease may be disposed at the preset position of the connecting piece 2. During a disconnection operation, the narrow chisel 5 may be corresponding to a position of the crease. After pressure is applied by the narrow chisel 5, the connecting piece 2 can be disconnected along the crease.

In the foregoing embodiments, before step S12, the failure treatment method may further include:

S11: Place a pad 3 between the connecting piece 2 and the enclosure 12 of the non-failed battery cell 14 connected to the connecting piece 2.

Since the connecting piece 2 made of metal has a certain degree of ductility, when bending is performed on the connecting piece 2, to avoid short circuit caused by contact between the connecting piece 2 and the enclosure 12 of the non-failed battery cell 14 during bending, a pad 3 may be placed between the enclosure 12 of the non-failed battery cell 14 and the connecting piece 2 to be bent. After bending, the pad 3 may be removed. The pad 3 not only can prevent the connecting piece 2 from being short-circuited with the non-failed battery cell 14, but also can protect the enclosure 12 of the non-failed battery cell 14 from being damaged during the bending process.

The pad 3 may be made of a non-conductive material, so that a short circuit can be prevented.

In the foregoing embodiments, when the battery module M2 does not fail, each connecting piece 2 (specifically the second connecting piece 2B) of the battery module M2 may include a structure such as a fracture guide portion 252 and a bending guide portion (that is, different from a common plate-like connecting piece structure on the market). When the battery module M2 fails, a corresponding operation only needs to be performed on the second connecting piece 2B connected to the failed battery cell 13, which has fewer maintenance steps.

In another specific embodiment, when the battery module M2 does not fail, the connecting piece 2 of the battery module M2 may be a common plate-like structure on the market, which does not include the foregoing structures such as the bending guide portion, or the fracture guide portion. When the battery module M2 fails, the connecting piece connected to the failed battery cell 13 is first removed (for example, connection between the connecting piece and an electrode terminal is cut) and replaced with the second connecting piece 2B (including structures such as the bending guide portion and the fracture guide portion, as shown in FIG. 17). The second connecting piece 2B is connected to the electrode terminal 11 of the failed battery cell 13. Then, the second connecting piece 2B is bent along the bending guide portion to form the first connecting portion 23, and the first connecting portion 23 is connected to the enclosure of the failed battery cell 13.

In this embodiment, a structure of the connecting piece 2 in the battery module M2 is relatively simple, and it is not necessary to set all connecting pieces as the structure including a fracture guide portion and a bending guide portion shown in FIG. 17, thereby saving costs.

The above are merely exemplary embodiments of this application and are not intended to limit this application. For those skilled in the art, this application may have various modifications and variations. Any modification, equivalent replacement, or improvement made without departing from the spirit and principle of this application shall fall within the protection scope of this application.

What is claimed is:

1. A battery module, comprising:
    a plurality of battery cells connected in series and comprising a failed battery cell and at least one non-failed battery cell adjacent to the failed battery cell, wherein each one of the battery cells comprises two electrode terminals and an enclosure; and
    a first connecting piece, wherein the first connecting piece comprises a first connecting portion and a conductive portion connected to the first connecting portion, the first connecting portion is of the first connecting piece is electrically connected to the enclosure of the failed battery cell, and the conductive portion of the first connecting pieces is electrically connected to one of the two electrode terminals of the at least one non-failed battery cell, so as to restore the battery module to work, wherein the failed battery cell is short-circuited in the plurality of battery cells;
    and wherein the plurality of battery cells further comprises two adjacent non-failed battery cells, and the battery module further comprises a second connecting piece connecting the two adjacent non-failed battery cells, and the second connecting piece is not in contact with the enclosures of the two non-failed battery cells; and the second connecting piece comprises:
    two conductive portions, wherein each one of the two conductive portions is connected to one of the two electrode terminals of each one of the two adjacent non-failed battery cells;
    a connecting portion connecting the two conductive portions,
    a bending guide portion in each one of the two conductive portions, the bending guide portion is configured to guide the second connecting piece to bend and form a connecting portion configured to be electrically connected to the enclosure of one of the two adjacent non-failed battery cells when the one of the two adjacent non-failed battery cells becomes a failed battery cell.

2. The battery module according to claim 1, wherein the enclosure comprises a housing and a top cover connected to the housing; and
    the first connecting portion is connected to the housing or the top cover of the failed battery cell.

3. The battery module according to claim 1, wherein the first connecting portion is bent, relative to the conductive portion, toward the enclosure of the failed battery cell, so that the first connecting portion is connected to the enclosure of the failed battery cell.

4. The battery module according to claim 1, wherein one of the first connecting portion and the enclosure of the failed battery cell is provided with a raised portion and the other is provided with a recessed portion; and
    the raised portion is configured to be connected to the recessed portion.

5. The battery module according to claim 4, wherein the raised portion is disposed in the enclosure, and the raised portion protrudes in a direction away from the enclosure;
    the recessed portion is a through hole disposed in the first connecting portion; and
    the raised portion is configured to plug into the through hole.

6. The battery module according to claim 1, wherein the first connecting portion is riveted or welded to the enclosure of the failed battery cell.

7. The battery module according to claim 1, wherein the first connecting portion is connected to the conductive portion by using a second connecting portion.

8. A battery pack, comprising:
    a case; and
    a battery module housed in the case, the battery module comprising:

a plurality of battery cells connected in series and comprising a failed battery cell and at least one non-failed battery cell adjacent to the failed battery cell, wherein each one of the battery cells comprises two electrode terminals and an enclosure; and a first connecting piece, wherein the first connecting piece comprises a first connecting portion and a conductive portion connected to the first connecting portion, the first connecting portion is electrically connected to the enclosure of the failed battery cell, and the conductive portion of the first connecting pieces is electrically connected to one of the two electrode terminals of the at least one non-failed battery cell, so as to restore the battery module to work, wherein the failed battery cell is short-circuited in the plurality of battery cells, wherein the plurality of battery cells further comprises two adjacent non-failed battery cells, and the battery module further comprises a second connecting piece connecting the two adjacent non-failed battery cells, and the second connecting piece is not in contact with the enclosures of the two non-failed battery cells; and the second connecting piece comprises:

two conductive portions, wherein each one of the two conductive portions is connected to one of the two electrode terminals of each one of the two adjacent non-failed battery cells;

a connecting portion connecting the two conductive portions, a bending guide portion in each one of the two conductive portions, the bending guide portion is configured to guide the second connecting piece to bend and form a connecting portion configured to be electrically connected to the enclosure of one of the two adjacent non-failed battery cells when the one of the two adjacent non-failed battery cells becomes a failed battery cell.

9. The battery pack according to claim 8, wherein the enclosure comprises a housing and a top cover connected to the housing; and the first connecting portion is connected to the housing or the top cover of the failed battery cell.

10. The battery pack according to claim 8, wherein the first connecting portion is bent, relative to the conductive portion, toward the enclosure of the failed battery cell, so that the first connecting portion is connected to the enclosure of the failed battery cell.

11. The battery pack according to claim 8, wherein one of the first connecting portion and the enclosure of the failed battery cell is provided with a raised portion and the other is provided with a recessed portion; and the raised portion is configured to be connected to the recessed portion.

12. The battery pack according to claim 11, wherein the raised portion is disposed in the enclosure, and the raised portion protrudes in a direction away from the enclosure;

the recessed portion is a through hole disposed in the first connecting portion; and the raised portion is configured to plug into the through hole.

13. The battery pack according to claim 8, wherein the first connecting portion is riveted or welded to the enclosure of the failed battery cell.

14. The battery pack according to claim 8, wherein the first connecting portion is connected to the conductive portion by using a second connecting portion.

15. An apparatus, comprising the battery pack according to claim 8, wherein the battery pack is configured to provide electric energy.

* * * * *